(12) United States Patent
Sugiura et al.

(10) Patent No.: US 10,793,734 B2
(45) Date of Patent: *Oct. 6, 2020

(54) OIL-BASED INKJET INK

(71) Applicant: RISO KAGAKU CORPORATION, Tokyo (JP)

(72) Inventors: Hikaru Sugiura, Ibaraki (JP); Shinsuke Ozawa, Ibaraki (JP); Shinichiro Shimura, Ibaraki (JP); Kazuyuki Ando, Ibaraki (JP); Marie Morinaga, Ibaraki (JP); Teruaki Okawa, Ibaraki (JP); Noriaki Sugawara, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 312 days.

This patent is subject to a terminal disclaimer.

(21) Appl. No.: 15/904,478

(22) Filed: Feb. 26, 2018

(65) Prior Publication Data

US 2018/0244937 A1    Aug. 30, 2018

(30) Foreign Application Priority Data

Feb. 28, 2017 (JP) ................... 2017-035942
Sep. 28, 2017 (JP) ................... 2017-188367

(51) Int. Cl.
| | | |
|---|---|---|
| *C09D 11/36* | (2014.01) |
| *C09D 11/033* | (2014.01) |
| *C09D 11/037* | (2014.01) |
| *C09D 11/324* | (2014.01) |
| *C09D 11/322* | (2014.01) |
| *C09D 11/38* | (2014.01) |

(52) U.S. Cl.
CPC .......... *C09D 11/36* (2013.01); *C09D 11/033* (2013.01); *C09D 11/037* (2013.01); *C09D 11/324* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 4,338,133 A * | 7/1982 | Toyoda ................ | C09D 11/36 106/31.58 |
| 5,968,244 A | 10/1999 | Ueda et al. | |
| 5,980,624 A | 11/1999 | Ichikawa et al. | |
| 6,113,679 A | 9/2000 | Adkins et al. | |
| 7,834,072 B2 | 11/2010 | Carlini et al. | |
| 8,038,784 B2 | 10/2011 | Watanabe et al. | |
| 8,440,010 B2 | 5/2013 | Endo | |
| 8,507,585 B2 | 8/2013 | Hosoya et al. | |
| 9,624,394 B2 | 4/2017 | Endo et al. | |
| 9,624,402 B2 | 4/2017 | Shimura et al. | |
| 9,821,568 B2 | 11/2017 | Shimura | |
| 9,845,402 B2 | 12/2017 | Shimura et al. | |
| 2003/0220418 A1* | 11/2003 | Horie ................. | C09D 11/36 523/160 |
| 2004/0063811 A1 | 4/2004 | Horie et al. | |
| 2004/0068031 A1* | 4/2004 | Horie ................. | C09D 11/36 523/160 |
| 2004/0265756 A1 | 12/2004 | Horie | |
| 2005/0046675 A1 | 3/2005 | Aoshima | |
| 2005/0119363 A1 | 6/2005 | Yamada et al. | |
| 2006/0189712 A1 | 8/2006 | Kondo | |
| 2007/0022904 A1 | 2/2007 | Kitawaki et al. | |
| 2008/0194754 A1* | 8/2008 | Nakamura .......... | C09D 11/322 524/497 |
| 2009/0090271 A1 | 4/2009 | Wynants et al. | |
| 2009/0263632 A1 | 10/2009 | Kojima et al. | |
| 2010/0136234 A1 | 6/2010 | Kobayashi | |
| 2012/0006225 A1 | 1/2012 | Tsukiana et al. | |
| 2012/0048141 A1 | 3/2012 | Arai et al. | |
| 2018/0244936 A1 | 8/2018 | Shimura et al. | |
| 2018/0244938 A1 | 8/2018 | Morinaga et al. | |
| 2018/0244939 A1 | 8/2018 | Sugiura et al. | |
| 2018/0244940 A1 | 8/2018 | Ando et al. | |
| 2018/0244941 A1 | 8/2018 | Sugiura et al. | |
| 2018/0327617 A1 | 11/2018 | Inoue et al. | |

(Continued)

FOREIGN PATENT DOCUMENTS

| | | |
|---|---|---|
| AU | 2012247077 B2 | 11/2012 |
| CN | 104610811 A | 5/2015 |

(Continued)

OTHER PUBLICATIONS

English translation of JP 2006/307107, Nov. 2006; 28 pages.*
English translation of JP 2016/196564, Nov. 2016; 29 pages.*
English translation of JP 2001/098196, Apr. 2001; 12 pages.*
English translation of JPH 03/292370, Dec. 1991; 6 pages.*
Reactive and Non-Reactive Silicone Fluid from Shin-Etsu Chemical Co. Ltd., shinetsusilicone-global.com/catalog/pdf/modified_e.pdf; 2006; 10 pages.*
"Phenyl Methyl Silicon Fluid" www.organosilicon.com/en/68083-14-7.htm, no date available; 1 page.*

(Continued)

*Primary Examiner* — Helene Klemanski
(74) *Attorney, Agent, or Firm* — Greenblum & Bernstein, P.L.C.

(57) ABSTRACT

Disclosed is an oil-based inkjet ink containing a colorant and a non-aqueous solvent, wherein the non-aqueous solvent contains at least 15% by mass but not more than 100% by mass, relative to the total mass of the non-aqueous solvent, of an organosilicon compound having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule.

23 Claims, No Drawings

(56) References Cited

U.S. PATENT DOCUMENTS

| | | | |
|---|---|---|---|
| 2019/0100002 A1* | 4/2019 | Ozawa | B41J 2/14233 |
| 2019/0100668 A1* | 4/2019 | Ando | C09D 11/40 |
| 2019/0100671 A1* | 4/2019 | Morinaga | C09D 11/54 |
| 2019/0134989 A1 | 5/2019 | Matsumoto et al. | |
| 2019/0300737 A1* | 10/2019 | Ozawa | C09D 11/107 |
| 2020/0040206 A1* | 2/2020 | Sugiura | C09D 11/326 |

FOREIGN PATENT DOCUMENTS

| | | |
|---|---|---|
| CN | 106084984 A | 11/2016 |
| EP | 1493783 A1 | 1/2005 |
| EP | 3093316 A1 | 11/2016 |
| EP | 3 366 737 | 8/2018 |
| EP | 3 366 739 | 8/2018 |
| JP | 01203482 A | 8/1989 |
| JP | H03-292370 A | 12/1991 |
| JP | H04-161467 A | 6/1992 |
| JP | H04-248879 A | 9/1992 |
| JP | 2001-098196 A | 4/2001 |
| JP | 2001-342388 | 12/2001 |
| JP | 2004-217703 A | 8/2004 |
| JP | 2005-60567 A | 3/2005 |
| JP | 2006-307107 A | 11/2006 |
| JP | 2006-315363 A | 11/2006 |
| JP | 2007-154149 A | 6/2007 |
| JP | 2010001452 | 1/2010 |
| JP | 2010/064478 | 3/2010 |
| JP | 2014-19766 A | 2/2014 |
| JP | 2016-196564 A | 11/2016 |

OTHER PUBLICATIONS

European Search Report issued with respect to Application No. 18158568.8, dated May 24, 2018.
European Search Report issued with respect to Application No. 18158557.1, dated May 24, 2018.
European Search Report issued with respect to Application No. 18158565.4, dated Jun. 1, 2018.
European Search Report issued with respect to Application No. 18158577.9, dated Jun. 21, 2018.
European Search Report issued with respect to Application No. 18158573.8, dated Jul. 18, 2018.
European Search Report issued with respect to Application No. 18158552.2, dated May 17, 2018.
Jan. 11, 2019 Office Action in copending U.S. Appl. No. 15/904,496, filed Feb. 26, 2018.
Official Communication issued in European Patent Office (EPO) Patent Application No. 18 158 557.1, dated Sep. 5, 2019.
Office Action in U.S. Appl. No. 15/904,496 dated Sep. 21, 2018.
"Silicone Fluid KF-96" from Shin-Etsu Chemical Co., Ltd.; shinetsusilicone-global.com/catalog/pdf/kf96_e.pdf. 2004; 36 pages.
Apr. 9, 2020 Office Action in copending U.S. Appl. No. 15/904,481, filed Feb. 26, 2018.
Apr. 13, 2020 Office Action in copending U.S. Appl. No. 15/904,504, filed Feb. 26, 2018.
English translation of JP 2004/217703, Aug. 2004; 9 pages.
Apr. 13, 2020 Office Action in copending U.S. Appl. No. 15/904,508, filed Feb. 26, 2018.
Apr. 15, 2020 Office Action in copending U.S. Appl. No. 16/141,054, filed Sep. 25, 2018.
Extended European Search Report from European Patent Office (EPO) in European Patent Appl. No. 18192237.8, dated Mar. 14, 2019.
English translation of JPH 04/248879, Sep. 1992; 13 pages.
Apr. 15, 2020 Office Action in copending U.S. Appl. No. 16/141,003, filed Sep. 25, 2018.
English translation of JP 2010/064478, Mar. 2010; 40 pages.
"Development of a Three-Dimensional Bioprinter: Construction of a Cell Supporting Structures Using Hydrogel and State-Of-The-Art Inkjet Technology" by Nishiyama et al.; J. Biomechanical Engineering, 131(3): 035001, Mar. 2009; 6 pages.
English translation of JP-01203482-A, Aug. 1989; 6 pages.
Apr. 7, 2020 Office Action in copending U.S. Appl. No. 15/904,476, filed Feb. 26, 2018.
Catalogue of Organic Modified Silicone, Dow Corning Toray Co., Ltd., in Japanese, with English Translation of page 10 (2016).
"Silicon Compounds: Silanes and Silicones," *GELEST, A Survey of Properties and Chemistry*, 3rd Edition, edited by Barry Arkles & Gerald L. Larson, Gelest, Inc. Morrisville, PA, 608 pages (2013).
Official Action dated Aug. 5, 2020 in the counterpart Chinese application No. 201810159232.X with translation.
Latest Practical Manual of Printing Technology, Letterpress Printing Technology Bulletin, Guangzhou, Tibet, p. 119, Hefei: Anhui Audio-Visual Publishing House, Nov. 2003. See #1, the English translation of SIPO's Office Action at pp. 4-5 as a concise explanation of pertinence of this non-patent literature.
"Silicone Production and Application Technology", Institute of Scientific and Technological Information, Ministry of Chemical Industry, p. 86 Institute of Scientific and Technological Information, Ministry of Chemical Industry, Dec. 1985. See #1, the English translation of SIPO's Office Action at pp. 4-5 as a concise explanation of pertinence of this non-patent literature.
"Modern Fine Chemical Technology and Product Synthesis Processes", Kwong Shenglu, pp. 273-274, Beijing: Science and Technology Literature Publishing House, Dec. 1997. See #1, the English translation of SIPO's Office Action at pp. 4-5 as a concise explanation of pertinence of this non-patent literature.

* cited by examiner

OIL-BASED INKJET INK

CROSS REFERENCE TO RELATED APPLICATIONS

This Application is based upon and claims the benefit of priority from prior Japanese Patent Applications No. 2017-035942 filed on Feb. 28, 2017, the entire contents of which are incorporated by reference herein, and prior Japanese Patent Applications No. 2017-188367 filed on Sep. 28, 2017, the entire contents of which are incorporated by reference herein.

BACKGROUND OF THE INVENTION

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

When a printed item having an image formed using an oil-based inkjet ink is stored by insertion in a clear file formed from polypropylene (PP) or the like, a problem arises in that the clear file tends to deform. One reason for this deformation is that when the clear file contacts the printed surface, the ink components cause one surface of the clear file to swell.

Patent Document 1 (JP 2007-154149 A) proposes an inkjet non-aqueous ink composition having superior discharge stability that neither swells nor greatly deforms transparent files, the ink containing a pigment, a dispersant and a non-aqueous solvent, wherein at least 50% of the total weight of the non-aqueous solvent is composed of an ester-based solvent having at least 24 but not more than 36 carbon atoms.

However, because ester-based solvents having a high number of carbon atoms have comparatively high viscosities, this ink using an ester-based solvent tends to suffer from unsatisfactory discharge performance of the ink from the inkjet nozzles.

Patent Document 2 (JP 2004-217703 A) proposes that by using an inkjet non-aqueous pigment ink containing a silicone-based solvent, a pigment, and a specific modified silicone oil as a dispersant, problems of ink stability, nozzle blockages and clear file deformation can all be improved.

Patent Document 3 (JP H04-248879 A) proposes that by using an inkjet recording ink containing, at least, 2 to 95 wt % of a silicone-based solvent with a boiling point of 100° C. to 250° C., and a colorant that is insoluble in the solvent, good print quality can be obtained regardless of the paper quality, satisfactory durability can be achieved several seconds after printing, and vivid images can be obtained with no color mixing in color images.

Patent Document 4 (JP 2016-196564 A) proposes that by using a non-aqueous inkjet ink composition containing a pigment, a non-aqueous solvent and a surfactant, wherein the surfactant contains a siloxane-based surfactant having an HLB value of at least 1.0 but not more than 7.0, the optical density of the image, and the discharge stability and storage stability of the ink can all be improved.

Patent Document 5 (JP H04-161467 A) proposes that by using an inkjet printer ink that uses an insulating solvent having a siloxane linkage in the molecular skeleton, high-density vivid printing is possible, the printed image has favorable rub fastness, and stable discharge can be achieved.

SUMMARY OF THE INVENTION

One embodiment of the present invention provides an oil-based inkjet ink containing a colorant and a non-aqueous solvent, wherein the non-aqueous solvent contains at least 15% by mass but not more than 100% by mass, relative to the total mass of the non-aqueous solvent, of an organosilicon compound having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule.

DETAILED DESCRIPTION OF THE EMBODIMENTS

The present invention is described below using embodiments. However, examples presented in the following embodiments in no way limit the present invention.

The silicone-based solvents proposed in Patent Documents 2 and 3 are mainly dimethyl silicones. Dimethyl silicones have a high affinity relative to the inkjet nozzle head. Accordingly, these inks that use a dimethyl silicone tend to adhere readily to the nozzle head, which can sometimes result in ink that has adhered to the nozzle head dripping onto the printed item, or ink solidifying in the vicinity of the nozzle head, causing nozzle discharge faults.

In Patent Document 4, the siloxane-based surfactant is added to improve the pigment dispersion stability, but because the surfactant must have sufficient hydrophilic group portions to facilitate adsorption to the pigment surface, it is not suited to the solvent.

Further, the polyether-modified siloxane-based surfactant proposed in Patent Document 4 has high polarity, and is therefore not suited to the solvent.

Moreover, Patent Documents 3 and 4 include no discussion regarding the deformation of clear files.

In Patent Document 5, an insulating solvent having a siloxane linkage in the molecular skeleton is used, but no detailed description is provided as to what types of functional groups are bonded to the siloxane linkage of the solvent, or how many siloxane linkages exist in the solvent. Further, Patent Document 5 includes no discussion regarding the deformation of clear files.

One object of the present invention is to prevent the deformation of clear files caused by printed items, improve the wetting characteristics of the ink on the nozzle plate, and improve the ink discharge performance from the inkjet nozzles.

The oil-based inkjet ink according to one embodiment (hereafter sometimes referred to as simply "the ink") contains a colorant and a non-aqueous solvent, wherein the non-aqueous solvent contains at least 15% by mass but not more than 100% by mass, relative to the total mass of the non-aqueous solvent, of an organosilicon compound having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule. Hereafter, this organosilicon compound is sometimes referred to as simply "the organosilicon compound S".

This oil-based inkjet ink can prevent the deformation of clear files caused by printed items, improve the wetting characteristics of the ink on the nozzle plate, and improve the ink discharge performance from the inkjet nozzles.

When a printed item prepared using an oil-based ink is inserted in a clear file, and particularly a clear file composed of polypropylene (PP), the ink components of the printed item, and particularly the non-aqueous solvent components, tend to volatilize and make contact with the clear file, and can sometimes cause the inside surface of the clear file to degenerate considerably, and undergo either swelling or shrinking relative to the outside surface of the clear file, resulting in deformation of the clear file.

Among the various non-aqueous solvents used in oil-based inks, this type of deformation tends to occur more readily when the structure of a petroleum-based hydrocarbon solvent is similar to that of the polypropylene of the clear file. In a similar manner to petroleum-based hydrocarbon solvents, deformation of clear files can also occur for those fatty acid ester-based solvents, higher fatty acid-based solvents, and higher alcohol-based solvents and the like that have similar structures to polypropylene.

By using a high-boiling point solvent in the ink, the non-aqueous solvent component can be prevented from volatilizing from the printed item, and clear file deformation can be prevented. However, high-boiling point solvents generally have high viscosities, and tend to suffer from poor ink dischargeability from the inkjet nozzles when used in an inkjet ink.

Liquid compounds having a silicon skeleton such as a siloxane structure can prevent clear file deformation while also exhibiting comparatively low viscosity. However, with these compounds, because the silicon skeleton portion such as the siloxane structure has a similar structure to the material of the nozzle plate, they can cause a reduction in the ink surface tension, making the ink more likely to adhere to the nozzle plate, which can lead to discharge defects.

Among the various compounds having a silicon skeleton, if the organosilicon compound S described above is used in an amount of at least 15% by mass relative to the total mass of the ink solvent, then because this compound has an organic group in which the total number of carbon atoms and oxygen atoms is at least 4, and because the total number of carbon atoms and oxygen atoms, contained within all of the organic groups in which the total number of carbon atoms and oxygen atoms is at least 4, is from 4 to 20 within one molecule, deformation of clear files can be prevented, and the wetting characteristics of the ink on the nozzle plate and the discharge performance can be improved.

The ink may contain a pigment, a dye, or a combination of the two as the colorant.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

The dispersed form of the pigment may contain a so-called encapsulated pigment in which the pigment is coated with an oil-insoluble resin, colored resin particles, or a dispersion in which the encapsulated pigment or resin particles are dispersed using a pigment dispersant, but a dispersion of a so-called self-dispersing pigment in which a functional group is chemically bonded to the pigment surface, or a dispersion obtained by adsorbing a pigment dispersant directly to the pigment surface is preferable.

From the viewpoints of discharge stability and storage stability, the average particle size of the pigment is preferably not more than 300 nm, more preferably not more than 200 nm, and even more preferably 150 nm or less.

The amount of the pigment is typically from 0.01 to 20% by mass of the total mass of the ink, and from the viewpoints of print density and ink viscosity, is preferably from 1 to 15% by mass, and more preferably from 5 to 10% by mass.

In order to ensure stable dispersion of the pigment in the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.; Solsperse 13940 (a polyester amine-based dispersant), 16000, 17000 and 18000 (fatty acid amine-based dispersants), and 11200, 24000 and 28000 (all product names), manufactured by The Lubrizol Corporation; Efka 400, 401, 402, 403, 450, 451 and 453 (modified polyacrylates) and Efka 46, 47, 48, 49, 4010 and 4055 (modified polyurethanes)

(all product names), manufactured by BASF Japan Ltd.; Disparlon KS-860 and KS-873N4 (polyester amine salts) (both product names), manufactured by Kusumoto Chemicals, Ltd.; Discol 202, 206, OA-202 and OA-600 (multi-chain polymeric nonionic dispersants) (all product names), manufactured by DKS Co., Ltd.; DISPERBYK 2155 and 9077 (both product names). manufactured by BYK-Chemie Japan K.K.; and Hypermer KD2, KD3, KD11 and KD12 (all product names), manufactured by Croda Japan K.K.

The amount of the pigment dispersant may only be sufficient to enable satisfactory dispersion of the pigment within the ink, and may be set as appropriate. For example, the pigment dispersant is typically added in a mass ratio within a range from 0.1 to 5, and preferably from 0.1 to 1, relative to a value of 1 for the pigment. Further, the pigment dispersant is typically added in an amount of 0.01 to 10% by mass, and preferably from 0.01 to 5% by mass, relative to the total mass of the ink.

In an oil-based ink, the amount of resin components, including the pigment dispersant, relative to the total mass of the ink, is typically not more than 10% by mass, preferably not more than 7% by mass, and even more preferably 5% by mass or less. This can prevent any increase in the ink viscosity, and improve the discharge performance.

For the dye, any of the dyes typically used in this technical field may be used. In the case of an oil-based ink, the use of an oil-soluble dye is preferred, as it exhibits better affinity with the non-aqueous solvent of the ink, resulting in superior storage stability.

Examples of oil-soluble dyes include azo dyes, metal complex salt dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metal phthalocyanine dyes. These dyes may be used individually, or a combination of two or more dyes may be used.

The amount of the dye is typically from 0.01 to 20% by mass relative to the total mass of the ink, and from the viewpoints of print density and ink viscosity, is preferably from 1 to 15% by mass, and more preferably from 5 to 10% by mass.

The ink contains, as a non-aqueous solvent, the organosilicon compound S having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule. The organosilicon compound S is preferably a compound in which all of the silicon atoms are bonded only to carbon atoms or siloxane linkage oxygen atoms. The organosilicon compound S is preferably unreactive. The constituent atoms of the organosilicon compound S are preferably only silicon atoms, carbon atoms, oxygen atoms and hydrogen atoms. By using this compound as an ink solvent, clear file deformation can be prevented when the printed items are stored in clear files.

The organosilicon compound S may contain at least one group selected from the group consisting of (A) to (D) described below as the organic group in which the total number of carbon atoms and oxygen atoms is at least 4.

(A) Alkyl groups having at least 4 carbon atoms.
(B) Carboxylate ester linkage-containing groups in which the total number of carbon atoms and oxygen atoms is at least 4.
(C) Aromatic ring-containing groups having at least 6 carbon atoms.
(D) Alkylene groups having at least 4 carbon atoms.

For example, one or more compounds selected from the group consisting of compounds (A) to (D) described below can be used as the organosilicon compound S.

(A) Compounds having a main-chain siloxane linkage and an alkyl group of at least 4 carbon atoms, hereafter also referred to as alkyl-modified silicones.
(B) Compounds having a main-chain siloxane linkage and a carboxylate ester linkage-containing group in which the total number of carbon atoms and oxygen atoms is at least 4, hereafter also referred to as ester-modified silicone oils.
(C) Compounds having a main-chain siloxane linkage and an aromatic ring-containing group of at least 6 carbon atoms, hereafter also referred to as aryl-modified silicone oils.
(D) Compounds having a silyl group or at least one siloxane linkage bonded to each of the two terminals of an alkylene group having at least 4 carbon atoms, hereafter also referred to as alkylene-modified silicone oils.

In the organosilicon compound S, the total number of carbon atoms and oxygen atoms contained in all of the organic groups in which the total number of carbon atoms and oxygen atoms is at least 4 is preferably 4 or greater, more preferably 8 or greater, and even more preferably 10 or greater, in one molecule. This enables ink wetting of the nozzle plate to be reduced.

In the organosilicon compound S, the total number of carbon atoms and oxygen atoms contained in all of the organic groups in which the total number of carbon atoms and oxygen atoms is at least 4 is preferably not more than 20, more preferably not more than 16, and even more preferably 12 or fewer, in one molecule. This enables the ink to have a lower viscosity, and can improve the discharge performance.

In those cases where one molecule of the organosilicon compound S contains two or more of the organic groups in which the total number of carbon atoms and oxygen atoms is at least 4, the total number of carbon atoms and oxygen atoms, in one molecule, that are contained within all of the organic groups in which the total number of carbon atoms and oxygen atoms is at least 4 refers to the total number of carbon atoms and oxygen atoms contained in the two or more organic groups that each has a total number of carbon atoms and oxygen atoms of at least 4.

From the viewpoint of preventing adhesion of the ink to the nozzle plate, the organosilicon compound S is preferably a compound in which the total number of carbon atoms and oxygen atoms, contained within all of the organic groups in which the total number of carbon atoms and oxygen atoms is at least 4, is from 4 to 12 within one molecule.

Further, from the viewpoints of lowering the viscosity of the ink and improving the discharge performance, the organosilicon compound S is preferably a compound in which the total number of carbon atoms and oxygen atoms, contained within all of the organic groups in which the total number of carbon atoms and oxygen atoms is at least 4, is from 8 to 20 within one molecule.

The organosilicon compound S is included in an amount of not more than 100% by mass relative to the total mass of the non-aqueous solvent. The organosilicon compound S is preferably included in an amount of not more than 80% by mass, and more preferably not more than 55% by mass, relative to the total mass of the non-aqueous solvent. Depending on the material of the nozzle plate, the organosilicon compound S may exhibit affinity for the nozzle plate, and therefore by restricting the amount of the organosilicon compound S to some degree, the wetting characteristics of the ink on the nozzle plate can be improved.

The organosilicon compound S is included in an amount of at least 15% by mass relative to the total mass of the non-aqueous solvent. This enables any increase in the viscosity of the overall non-aqueous solvent to be suppressed, and can improve the discharge performance. The organosilicon compound S is preferably included in an amount of at least 20% by mass, and more preferably at least 25% by mass, relative to the total mass of the non-aqueous solvent.

From the viewpoint of preventing adhesion of the ink to the nozzle plate, the amount of the organosilicon compound S is preferably from 15 to 80% by mass relative to the total mass of the non-aqueous solvent.

Further, from the viewpoints of lowering the ink viscosity and improving the discharge performance, the amount of the organosilicon compound S is preferably from 25 to 55% by mass relative to the total mass of the non-aqueous solvent.

The amount of the organosilicon compound S relative to the total mass of the ink varies depending on the total amount of the non-aqueous solvent used, but is typically from 12 to 98% by mass, and may be from 15 to 90% by mass.

Examples of the organosilicon compound S include silicone oils represented by general formula (X) shown below.

[Chemical formula 1]

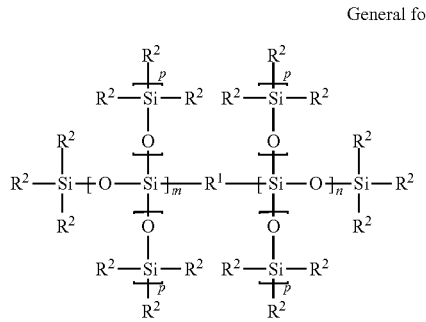

General formula (X)

In general formula (X), $R^1$ represents an oxygen atom or a divalent organic group having a carbon atom bonded directly to each silicon atom, each $R^2$ independently represents a monovalent organic group having a carbon atom bonded directly to the silicon atom, each of m and n independently represents an integer of 0 to 4, each p independently represents an integer of 0 to 2, the number of silicon atoms within one molecule is from 2 to 6, at least one of $R^1$ and $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X), it is preferable that $R^1$ is an oxygen atom, or a divalent organic group in which the total number of carbon atoms and oxygen atoms is at least 4, and each $R^2$ independently represents a methyl group, or a monovalent organic group in which the total number of carbon atoms and oxygen atoms is at least 4.

It is preferable that in general formula (X), $R^1$ is an oxygen atom or an alkylene group having at least 4 carbon atoms, and each $R^2$ independently represents a methyl group, an alkyl group having at least 4 carbon atoms, a carboxylate ester linkage-containing group in which the total number of carbon atoms and oxygen atoms is at least 4, or an aromatic ring-containing group having at least 6 carbon atoms, wherein at least one of $R^1$ and $R^2$ is a group selected from the group consisting of alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, and the total number of carbon atoms and oxygen atoms in one molecule that are contained within all of the alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, is from 4 to 20.

Other examples of the organosilicon compound S include silicone oils represented by general formula (X-1) shown below.

[Chemical formula 2]

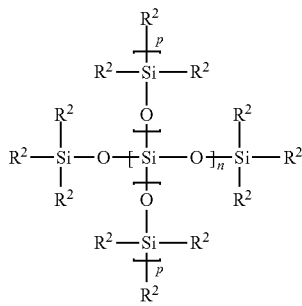

General formula (X-1)

In general formula (X-1), each $R^2$ independently represents a monovalent organic group having a carbon atom bonded directly to the silicon atom, n represents an integer of 0 to 4, each p independently represents 0 or 1, the number of silicon atoms within one molecule is from 2 to 6, at least one $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X-1), it is preferable that each $R^2$ independently represents a methyl group or a monovalent organic group in which the total number of carbon atoms and oxygen atoms is at least 4.

(A) Alkyl-Modified Silicone Oils

One embodiment of the organosilicon compound S is a compound having 2 to 6 silicon atoms and an alkyl group having at least 4 carbon atoms, and is preferably a compound having a main-chain siloxane linkage, and an alkyl group of at least 4 carbon atoms in which a carbon atom is bonded directly to a silicon atom of the main chain (namely, an alkyl-modified silicone oil).

By using this compound as an ink solvent, when a printed item is stored in a clear file, deformation of the clear file can be prevented.

The main-chain siloxane linkage of the alkyl-modified silicone oil preferably contains 2 to 6 silicon atoms, more preferably 3 to 5 silicon atoms, and most preferably 3 silicon atoms. For example, the main-chain siloxane linkage is preferably a trisiloxane (having 3 silicon atoms).

A branched chain such as a trimethylsilyloxy group may branch from the main-chain siloxane linkage as a side chain.

The alkyl group having at least 4 carbon atoms may be bonded to the silicon atom at either terminal or to the silicon atoms at both terminals of the main-chain siloxane linkage, may be bonded as a side chain, or may be introduced at one or both terminals and as a side chain.

Examples of alkyl-modified silicone oils are as described below in (1) to (4).

(1) Compounds having an alkyl group of at least 4 carbon atoms at one terminal of the main-chain siloxane linkage.

(2) Compounds having an alkyl group of at least 4 carbon atoms at each of the two terminals of the main-chain siloxane linkage.

(3) Compounds having a single alkyl group of at least 4 carbon atoms as a side chain on the main-chain siloxane linkage.

(4) Compounds having two or more alkyl groups of at least 4 carbon atoms as side chains on the main-chain siloxane linkage.

The alkyl group of at least 4 carbon atoms may have a straight chain or branched chain, and may be chain-like or alicyclic. The alkyl group of at least 4 carbon atoms preferably has 4 to 20 carbon atoms.

By ensuring that the number of carbon atoms in the alkyl group is at least 4, preferably at least 8, and even more preferably 10 or greater, the wetting characteristics of the ink on the nozzle plate can be improved.

By ensuring that the number of carbon atoms in the alkyl group is not more than 20, preferably not more than 16, and even more preferably 12 or fewer, clear file deformation can be prevented, any increase in the ink viscosity can be suppressed, and the discharge performance can be improved.

Examples of the alkyl group having at least 4 carbon atoms include an n-butyl group, isobutyl group, tert-butyl group, pentyl group, hexyl group, heptyl group, octyl group, isooctyl group, nonyl group, decyl group, dodecyl group, hexadecyl group and eicosyl group.

Preferred groups include an octyl group, decyl group, dodecyl group and hexadecyl group, and a decyl group or dodecyl group is particularly preferred.

In the alkyl-modified silicone oil, the total number of carbon atoms contained in all the alkyl groups of at least 4 carbon atoms in one molecule is preferably at least 4, more preferably at least 8, and even more preferably 10 or greater. This enables ink wetting of the nozzle plate surface to be reduced.

In the alkyl-modified silicone oil, the total number of carbon atoms contained in all the alkyl groups of at least 4 carbon atoms in one molecule is preferably not more than 20, more preferably not more than 16, and even more preferably 12 or fewer. This ensures a lower ink viscosity, meaning the discharge performance can be improved.

In those cases where one molecule of the alkyl-modified silicone oil contains two or more alkyl groups of at least 4 carbon atoms, the total number of carbon atoms contained in all the alkyl groups of at least 4 carbon atoms in one molecule means the total number of carbon atoms in the two or more alkyl groups of at least 4 carbon atoms.

Examples of the alkyl-modified silicone oil include compounds represented by general formula (A1) shown below.

[Chemical formula 3]

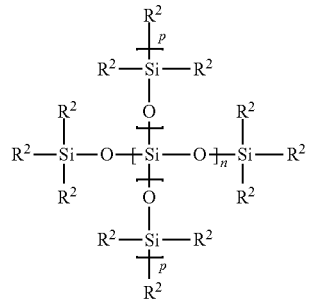

General formula (A1)

In general formula (A1), each $R^2$ independently represents a methyl group or an alkyl group having at least 4 carbon atoms, n represents an integer of 0 to 4, each p independently represents 0 or 1, the number of silicon atoms within one molecule is from 2 to 6, at least one $R^2$ is an alkyl group having at least 4 carbon atoms, and the total number of carbon atoms contained within all of the alkyl groups having at least 4 carbon atoms, is from 4 to 20 within one molecule.

In the alkyl-modified silicone oil, the main chain preferably has 3 silicon atoms, and for example, a trisiloxane compound represented by general formula (A2) shown below can be used.

[Chemical formula 4]

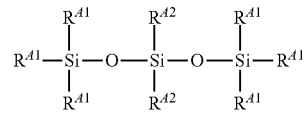

General formula (A2)

In general formula (A2), $R^{A1}$ represents a methyl group or an alkyl group having at least 4 carbon atoms, $R^{A2}$ represents a methyl group, an alkyl group having at least 4 carbon atoms or a trimethylsilyloxy group, at least one of $R^{A1}$ and $R^{A2}$ represents an alkyl group having at least 4 carbon atoms, the $R^{A1}$ groups and $R^{A2}$ groups may all be the same, some may be different, or all may be mutually different, and the number of silicon atoms within one molecule is from 2 to 6.

For example, compounds represented by general formula (1) shown below can be used as the alkyl-modified silicone oil.

[Chemical formula 5]

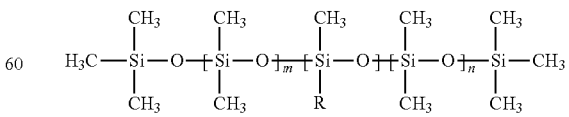

(1)

In general formula (1), R represents an alkyl group having a straight chain or branched chain of 4 to 20 carbon atoms, and each of m and n independently represents an integer of 0 to 2, provided that $m+n \leq 2$.

In general formula (1), R represents an alkyl group having a straight chain or branched chain of 4 to 20 carbon atoms. By ensuring that the number of carbon atoms in the alkyl group represented by R is at least 4, preferably at least 8, and even more preferably 10 or greater, the wetting characteristics of the ink on the nozzle plate can be improved. In particular, a carbon number of 10 or greater increases the surface tension, thereby improving the wetting characteristics.

Further, by ensuring that the number of carbon atoms in the alkyl group represented by R is not more than 20, preferably not more than 16, and even more preferably 12 or fewer, clear file deformation can be prevented, any increase in the ink viscosity can be suppressed, and the discharge performance can be improved.

In general formula (1), examples of the alkyl group represented by R include an n-butyl group, isobutyl group, tert-butyl group, pentyl group, hexyl group, heptyl group, octyl group, isooctyl group, nonyl group, decyl group, dodecyl group, hexadecyl group and eicosyl group.

Preferred alkyl groups include an octyl group, decyl group, dodecyl group and hexadecyl group, and a decyl group or dodecyl group is particularly preferred.

The compound represented by general formula (1) is preferably a compound shown below in which both m and n are 0. R is as described above.

[Chemical formula 6]

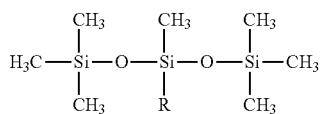

The alkyl-modified silicone oil described above can be produced using the method described below, but the invention is not restricted to this particular method.

For example, an alkyl-modified silicone oil can be obtained by reacting a siloxane raw material and an alkene having at least 4 carbon atoms in an organic solvent. The siloxane raw material and the alkene are preferably reacted in a molar ratio within a range from 1:1 to 1:1.5. When two or more alkyl groups are to be introduced into the siloxane skeleton, the reaction is preferably performed with a molar ratio between the reactive groups in the siloxane raw material and the alkene that is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

For example, by reacting a compound of general formula (1) in which R represents a hydrogen atom as the siloxane raw material, and an alkene having a straight chain or branched chain of 4 to 20 carbon atoms in an organic solvent, a compound represented by general formula (1) can be obtained.

Examples of compounds that can be used as the siloxane raw material include 1,1,1,3,5,5,5-heptamethyltrisiloxane, 1,1,1,3,3,5,7,7,7-nonamethyltetrasiloxane, 1,1,1,3,3,5,7,7,9,9,9-undecamethylpentasiloxane, pentamethyldisiloxane, 1,1,3,3,5,5,5-heptamethyltrisiloxane, 1,1,3,3,-tetramethyldisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,1,5,5,5-hexamethyl-3-(trimethylsilyloxy)trisiloxane, 1,1,1,5,5,5-hexamethyltrisiloxane, 1,1,1,3,5,7,7,7-octamethyltetrasiloxane, 1,1,3,5,5-pentamethyl-3-(dimethylsilyloxy)trisiloxane, 1,1,3,3,5,5,7,7,9,9,11,11-dodecamethylhexasiloxane, and trimethylsilane.

Examples of alkenes that may be used include ethylene, 1-butene, 2-butene, 1-pentene, 1-hexene, 1-heptene, 1-octene, 2-octene, 1-nonene, 1-decene, 1-dodecene, 1-hexadecene and 1-eicosene.

Further, besides alkenes, alicyclic hydrocarbons having an ethylenic double bond such as vinylcyclohexane can also be used.

(B) Ester-Modified Silicone Oils

One embodiment of the organosilicon compound S is a compound having 2 to 6 silicon atoms and a carboxylate ester linkage-containing group in which the total number of carbon atoms and oxygen atoms is at least 4, and is preferably a compound having a main-chain siloxane linkage, and a carboxylate ester linkage-containing group in which a carbon atom is bonded directly to a silicon atom of the main chain and in which the total number of carbon atoms and oxygen atoms is at least 4 (namely, an ester-modified silicone oil).

By using this compound as an ink solvent, when a printed item is stored in a clear file, deformation of the clear file can be prevented.

The main-chain siloxane linkage of the ester-modified silicone oil preferably contains 2 to 6 silicon atoms, more preferably 3 to 5 silicon atoms, and most preferably 3 silicon atoms. For example, the main-chain siloxane linkage is preferably a trisiloxane (having 3 silicon atoms).

A branched chain such as a trimethylsilyloxy group may branch from the main-chain siloxane linkage as a side chain.

The carboxylate ester linkage-containing group may be bonded to the silicon atom at either terminal or to the silicon atoms at both terminals of the main-chain siloxane linkage, may be bonded as a side chain, or may be introduced at one or both terminals and as a side chain.

A group represented by —$R^{Bb}$—O—(CO)—$R^{Ba}$ or a group represented by —$R^{Bb}$—(CO)—O—$R^{Ba}$, in which the carboxylate ester linkage is bonded to a silicon atom of the main-chain siloxane linkage via an alkylene group, can be used favorably as the carboxylate ester linkage-containing group.

Here, $R^{Ba}$ may have a straight chain or branched chain having at least 1 carbon atom, and is preferably a chain-like or alicyclic alkyl group. Further $R^{Bb}$ may have a straight chain or branched chain having at least 1 carbon atom, and is preferably a chain-like or alicyclic alkylene group. The alkylene group linking the silicon atom of the main-chain siloxane linkage and the carboxylate ester linkage more preferably has at least 2 carbon atoms.

The total number of carbon atoms and oxygen atoms in the carboxylate ester linkage-containing group is the total of the one carbon atom and two oxygen atoms in the ester linkage (—O—(CO)—), the number of carbon atoms in the alkyl group ($R^{Ba}$), and the number of carbon atoms in the alkylene group ($R^{Bb}$).

The total number of carbon atoms and oxygen atoms in the carboxylate ester linkage-containing group is preferably from 4 to 20.

By ensuring that the total number of carbon atoms and oxygen atoms in the carboxylate ester linkage-containing group is at least 4, preferably at least 8, and more preferably 10 or greater, the wetting characteristics of the ink on the nozzle plate can be improved.

By ensuring that the total number of carbon atoms and oxygen atoms in the carboxylate ester linkage-containing group is not more than 20, preferably not more than 16, and even more preferably 12 or fewer, clear file deformation can be prevented, any increase in the ink viscosity can be suppressed, and the discharge performance can be improved.

In the carboxylate ester linkage-containing group, examples of the alkyl group ($R^{Ba}$) include a methyl group, ethyl group, propyl group, isopropyl group, n-butyl group, isobutyl group, tert-butyl group, pentyl group, hexyl group, heptyl group, octyl group, isooctyl group, nonyl group, decyl group, dodecyl group, hexadecyl group and heptadecyl group.

Preferred alkyl groups include a pentyl group, heptyl group, nonyl group and tridecyl group, and a heptyl group or nonyl group is particularly preferred.

In the carboxylate ester linkage-containing group, the alkylene group ($R^{Bb}$) is preferably a linear alkylene group of 1 to 8 carbon atoms, and examples include a methylene group, ethylene group, propylene group, trimethylene group, n-butylene group, isobutylene group, pentylene group, hexylene group, heptylene group, octylene group and isooctylene group. An ethylene group is preferred.

In the ester-modified silicone oil, the total number of carbon atoms and oxygen atoms, contained in all the carboxylate ester linkage-containing groups in which the total number of carbon atoms and oxygen atoms is at least 4, is preferably at least 4 in one molecule, and is more preferably at least 8, and even more preferably 10 or greater, in one molecule. This enables ink wetting of the nozzle plate surface to be reduced.

In the ester-modified silicone oil, the total number of carbon atoms and oxygen atoms, contained in all the carboxylate ester linkage-containing groups in which the total number of carbon atoms and oxygen atoms is at least 4, is preferably not more than 20 in one molecule, more preferably not more than 16, and even more preferably 12 or fewer, in one molecule. This ensures a lower ink viscosity, meaning the discharge performance can be improved.

In those cases where one molecule of the ester-modified silicone oil contains two or more carboxylate ester linkage-containing groups in which the total number of carbon atoms and oxygen atoms is at least 4, the total number of carbon atoms and oxygen atoms contained in all the carboxylate ester linkage-containing groups in one molecule means the total number of carbon atoms and oxygen atoms in the two or more carboxylate ester linkage-containing groups.

Examples of compounds that can be used favorably as the ester-modified silicone include compounds of the above general formula (X-1) in which each $R^2$ independently represents a methyl group or a carboxylate ester linkage-containing group in which a carbon atom is bonded directly to a silicon atom and in which the total number of carbon atoms and oxygen atoms is at least 4, n represents an integer of 0 to 4, each p independently represents 0 or 1, the number of silicon atoms within one molecule is from 2 to 6, at least one $R^2$ is an aforementioned carboxylate ester linkage-containing group, and the total number of carbon atoms and oxygen atoms contained within all of the carboxylate ester linkage-containing groups within one molecule is from 4 to 20.

Examples of the ester-modified silicone include compounds represented by general formula (B1) shown below.

[Chemical formula 7]

General formula (B1)

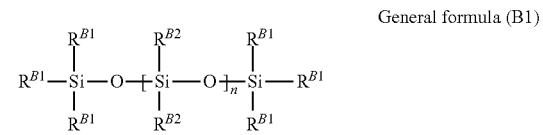

In general formula (B1), each $R^{B1}$ independently represents a methyl group or a carboxylate ester linkage-containing group in which a carbon atom is bonded directly to the silicon atom and in which the total number of carbon atoms and oxygen atoms is at least 4, each $R^{B2}$ independently represents a methyl group, a trimethylsilyloxy group, or a carboxylate ester linkage-containing group in which a carbon atom is bonded directly to the silicon atom and in which the total number of carbon atoms and oxygen atoms is at least 4, at least one $R^{B1}$ or $R^{B2}$ is an aforementioned carboxylate ester linkage-containing group in which the total number of carbon atoms and oxygen atoms is at least 4, n represents an integer of 0 to 4, and the number of silicon atoms within one molecule is from 2 to 6.

The carboxylate ester linkage-containing group is as described above.

The ester-modified silicone oil described above can be produced using the method described below, but the invention is not restricted to this particular method.

For example, an ester-modified silicone oil can be obtained by reacting a siloxane raw material and a vinyl ester of an aliphatic acid in which the total number of carbon atoms and oxygen atoms is at least 4 in an organic solvent. The siloxane raw material and the vinyl ester of an aliphatic acid are preferably reacted with a molar ratio between the reactive groups in the siloxane raw material and the vinyl ester of an aliphatic acid that is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil can be used.

Examples of vinyl esters of aliphatic acids that may be used include vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate and vinyl eicosanoate.

(C) Aryl-Modified Silicone Oils

One embodiment of the organosilicon compound S is a compound having 2 to 6 silicon atoms and an aromatic ring-containing group having a total number of carbon atoms of at least 6, and is preferably a compound having a main-chain siloxane linkage, and an aromatic ring-containing group in which a carbon atom is bonded directly to a silicon atom of the main chain and in which the total number of carbon atoms is at least 6 (namely, an aryl-modified silicone oil).

By using this compound as an ink solvent, when a printed item is stored in a clear file, deformation of the clear file can be prevented.

Aromatic rings have higher boiling points than linear alkanes having the same number of carbon atoms, and are less likely to volatilize.

Moreover, in the aryl-modified silicone oil, because an aromatic ring that is bulkier than an alkyl group exists within the molecule, following printing of the ink to a recording medium, even if the solvent component were to volatilize from the printed item while stored in a clear file, permeation of the solvent component into the clear file is less likely, meaning deformation of the clear file can be further reduced.

The siloxane linkage of the main chain of the aryl-modified silicone oil preferably contains 2 to 6 silicon atoms, more preferably 3 to 5 silicon atoms, and most preferably 3 silicon atoms. For example, the main-chain siloxane linkage is preferably a trisiloxane (having 3 silicon atoms).

A branched chain such as a trimethylsilyloxy group may branch from the main-chain siloxane linkage as a side chain.

The aromatic ring-containing group may be bonded to the silicon atom at either terminal or to the silicon atoms at both terminals of the main-chain siloxane linkage, may be bonded as a side chain, or may be introduced at one or both terminals and as a side chain.

A group represented by —$R^{Ca}$ in which the aromatic ring is bonded directly to a silicon atom of the main-chain siloxane linkage, or a group represented by —$R^{Cb}$—$R^{Ca}$, which the aromatic ring is bonded to a silicon atom of the main-chain siloxane linkage via an alkylene group, can be used favorably as the aromatic ring-containing group.

Here, $R^{Ca}$ is preferably an aromatic ring having at least 6 carbon atoms. Further, $R^{Cb}$ may have a straight chain or branched chain having at least 1 carbon atom, and is preferably a chain-like or alicyclic alkylene group.

When the aromatic ring-containing group is a group represented by —$R^{Ca}$ in which the aromatic ring is bonded directly to a silicon atom of the main-chain siloxane linkage, it is preferable that a branched chain such as a trimethylsilyloxy group branches from the main-chain siloxane linkage as a side chain. It is even more preferable that the aromatic ring-containing group is a group represented by in which the aromatic ring is bonded to a silicon atom of the main-chain siloxane linkage via an alkylene group.

The number of carbon atoms in the aromatic ring-containing group is the total of the number of carbon atoms in the aromatic ring ($R^{Ca}$) and the number of carbon atoms in the optional alkylene group ($R^{Cb}$).

The number of carbon atoms in the aromatic ring-containing group is preferably from 6 to 20.

By ensuring that the number of carbon atoms in the aromatic ring-containing group is at least 6, preferably at least 8, and more preferably 10 or greater, the wetting characteristics of the ink on the nozzle plate can be improved.

By ensuring that the number of carbon atoms in the aromatic ring-containing group is not more than 20, preferably not more than 16, and more preferably 12 or fewer, clear file deformation can be prevented, any increase in the ink viscosity can be suppressed, and the discharge performance can be improved.

In the aromatic ring-containing group, examples of the aromatic ring portion ($R^{Ca}$) include a phenyl group, tolyl group, xylyl group, trimethylphenyl group, biphenylyl group, naphthyl group or anthracenyl group, or a functional group in which at least one hydrogen atom of one of these groups has been substituted with an alkyl group.

The aromatic ring-containing group may contain one, or two or more aromatic rings, but the total number of carbon atoms in all of the aromatic ring-containing groups of at least 6 carbon atoms in one molecule is preferably from 6 to 20.

In the aromatic ring-containing group, the optional alkylene group ($R^{Cb}$) is preferably an alkylene group of 1 to 8 carbon atoms that may have a straight chain or a branched chain, and examples include a methylene group, ethylene group, propylene group, trimethylene group, n-butylene group, isobutylene group, pentylene group, hexylene group, heptylene group, octylene group and isooctylene group.

A propylene group, methylethylene group or ethylene group is preferred.

In the aryl-modified silicone oil, the total number of carbon atoms contained in all the aromatic ring-containing groups of at least 6 carbon atoms in one molecule is preferably at least 6, more preferably at least 8, and even more preferably 10 or greater. This enables ink wetting of the nozzle plate surface to be reduced.

In the aryl-modified silicone oil, the total number of carbon atoms contained in all the aromatic ring-containing groups of at least 6 carbon atoms in one molecule is preferably not more than 20, more preferably not more than 16, and even more preferably 12 or fewer. This ensures a lower ink viscosity, meaning the discharge performance can be improved.

In those cases where one molecule of the aryl-modified silicone oil contains two or more aromatic ring-containing groups of at least 6 carbon atoms, the total number of carbon atoms contained in all the aromatic ring-containing groups of at least 6 carbon atoms in one molecule means the total number of carbon atoms in the two or more aromatic ring-containing groups of at least 6 carbon atoms.

Examples of compounds that can be used favorably as the aryl-modified silicone include compounds of the above general formula (X-1) in which each $R^2$ independently represents a methyl group or an aromatic ring-containing group of at least 6 carbon atoms in which a carbon atom is bonded directly to a silicon atom, n represents an integer of 0 to 4, each p independently represents 0 or 1, the number of silicon atoms within one molecule is from 2 to 6, at least one $R^2$ is an aforementioned aromatic ring-containing group, and the total number of carbon atoms contained within all of the aromatic ring-containing groups within one molecule is from 6 to 20.

Examples of the aryl-modified silicone include compounds represented by general formula (C1) shown below.

[Chemical formula 8]

General formula (C1)

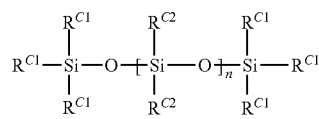

In general formula (C1), each $R^{C1}$ independently represents a methyl group or an aromatic ring-containing group of at least 6 carbon atoms in which a carbon atom is bonded directly to the silicon atom, each $R^{C2}$ independently represents a methyl group, a trimethylsilyloxy group, or an aromatic ring-containing group of at least 6 carbon atoms in which a carbon atom is bonded directly to the silicon atom, at least one $R^{C1}$ or $R^{C2}$ is an aforementioned aromatic ring-containing group of at least 6 carbon atoms, n represents an integer of 0 to 4, and the number of silicon atoms within one molecule is from 2 to 6.

The aromatic ring-containing group is as described above.

A compound having a trisiloxane skeleton, in which n=1 in general formula (C1), is preferred.

The aryl-modified silicone oil described above can be produced using the method described below, but the invention is not restricted to this particular method.

For example, an aryl-modified silicone oil can be obtained by reacting a siloxane raw material and an aryl compound of 6 to 20 carbon atoms having a carbon double bond in an organic solvent. The siloxane raw material and the aryl compound are preferably reacted with a molar ratio between the reactive groups in the siloxane raw material and the carbon double bond in the aryl compound that is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil can be used.

Examples of aryl compounds having a carbon double bond that may be used include styrene, 4-methylstyrene, 2-methylstyrene, 4-tert-butylstyrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenylethylene, triphenylethylene, 2,4,6-trimethylstyrene, cis-β-methylstyrene, and trans-β-methylstyrene.

(D) Alkylene-Modified Silicone Oils

One embodiment of the organosilicon compound S is a compound having 2 to 6 silicon atoms and an alkylene group having at least 4 carbon atoms, and is preferably a compound in which a silyl group or at least one siloxane linkage is bonded to the carbon atom at each of the two terminals of an alkylene group having at least 4 carbon atoms (namely, an alkylene-modified silicone oil).

By using this compound as an ink solvent, when a printed item is stored in a clear file, deformation of the clear file can be prevented.

The alkylene-modified silicone oil preferably contains 2 to 6 silicon atoms, more preferably 3 to 5 silicon atoms, and most preferably 4 silicon atoms.

In the alkylene-modified silicone oil, the silyl group or siloxane linkage at one terminal of the alkylene group preferably contains 1 to 5 silicon atoms, more preferably 1 to 4 silicon atoms, and even more preferably 2 or 3 silicon atoms.

When the alkylene-modified silicone oil has a siloxane linkage having 3 or more silicon atoms at one terminal of the alkylene group, a branched chain such as a trimethylsilyloxy group may branch from the main-chain siloxane linkage as a side chain.

The alkylene group of at least 4 carbon atoms may have a straight chain or branched chain, and may be chain-like or alicyclic. The alkylene group of at least 4 carbon atoms preferably has 4 to 20 carbon atoms.

By ensuring that the number of carbon atoms in the alkylene group is at least 4, and preferably at least 8, the wetting characteristics of the ink on the nozzle plate can be improved.

By ensuring that the number of carbon atoms in the alkylene group is not more than 20, preferably not more than 12, and even more preferably 10 or fewer, clear file deformation can be prevented, any increase in the ink viscosity can be suppressed, and the discharge performance can be improved.

Examples of the alkylene group of at least 4 carbon atoms include an n-butylene group, isobutylene group, pentylene group, hexylene group, heptylene group, octylene group, isooctylene group, nonylene group, decylene group, dodecylene group, hexadecylene group and eicosylene group. An octylene group, decylene group or dodecylene group is preferred, and an octylene group or decylene group is particularly desirable.

Examples of compounds that can be used favorably as the alkylene-modified silicone include compounds of the above general formula (X) in which $R^1$ represents an alkylene group having at least 4 carbon atoms, $R^2$ represents a methyl group, each of m and n independently represents an integer of 0 to 4, each p independently represents an integer of 0 to 2, and the number of silicon atoms within one molecule is from 2 to 6.

Examples of the alkylene-modified silicone oil include compounds represented by general formula (D1) shown below.

[Chemical formula 9]

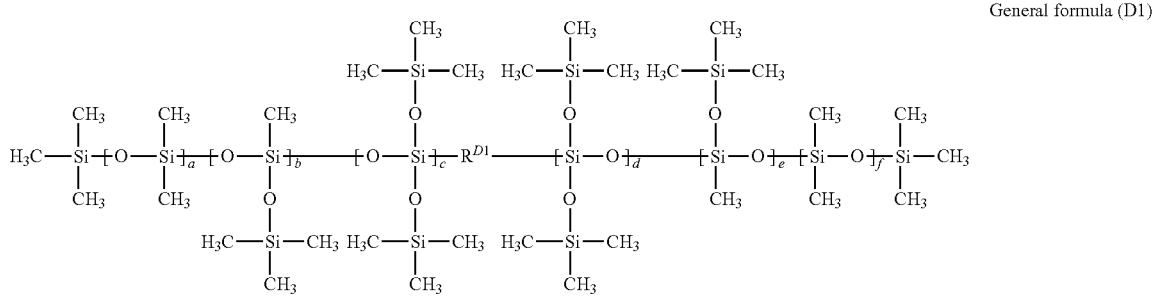

General formula (D1)

In general formula (D1), $R^{D1}$ represents an alkylene group having at least 4 carbon atoms, each of a and f independently represents an integer of 0 to 2, each of b and e independently represents an integer of 0 or 1, and each of c and d independently represents an integer of 0 or 1, provided that $a+b+c \leq 2$ and $d+e+f \leq 2$, and the number of silicon atoms within one molecule is from 2 to 6.

In general formula (D1), it is preferable that $1 \leq a+b+c \leq 2$ and $1 \leq d+e+f \leq 2$. Further, in general formula (D1), it is preferable that $R^{D1}$ is an alkylene group having 8 to 10 carbon atoms.

The alkylene-modified silicone oil described above can be produced using the method described below, but the invention is not restricted to this particular method.

For example, an alkylene-modified silicone oil can be obtained by reacting a siloxane raw material and a diene compound having 4 to 20 carbon atoms in an organic solvent. The siloxane raw material and the diene compound are preferably reacted in a molar ratio within a range from 2:1 to 3:1. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil can be used. In one example of the alkylene-modified silicone oil, two trimethylsilane groups may be bonded via the alkylene group, yielding a compound having 2 silicon atoms in one molecule.

Examples of diene compounds that may be used include 1,3-butadiene, 1,3-pentadiene, 1,4-pentadiene, 1,5-hexadiene, 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

Commercially available products may be used as the organosilicon compound, and examples of products that may be used include alkyl-modified silicone oils such as "FZ-3196" manufactured by Dow Corning Toray Co., Ltd., and aryl-modified silicone oils such as "1,1,1,5,5,5-hexamethyl-3-phenyl-3-(trimethylsilyloxy)trisiloxane" manufactured by Tokyo Chemical Industry Co., Ltd.

The ink may also contain other non-aqueous solvents.

Both non-polar organic solvents and polar organic solvents can be used as these other non-aqueous solvents. In the embodiments, a water-insoluble organic solvent that does not mix uniformly with an equal volume of water at 1 atmosphere and 20° C. is preferably used as this other non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, isotridecyl isononanoate (22 carbon atoms), methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate;

higher alcohol-based solvents having at least 6 carbon atoms, and preferably 12 to 20 carbon atoms, within one molecule, such as isomyristyl alcohol, isopalmityl alcohol, isostearyl alcohol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase.

In the embodiments, in those cases where another non-aqueous solvent is used besides the organosilicon compound S, in order to prevent clear file deformation, the other non-aqueous solvent is preferably a high-boiling point solvent. This high-boiling point solvent is preferably a non-polar solvent having an initial boiling point of at least 200° C., a polar solvent having a boiling point of 250° C. or higher, or a combination of the two.

Further, by using a high-boiling point solvent as the other non-aqueous solvent, volatilization of the solvent is suppressed, and clear file deformation can be better prevented. Examples of solvents that can be used favorably as this type of non-aqueous solvent include paraffin-based solvents such as MORESCO White P-60, and fatty acid ester-based solvents having at least 20 carbon atoms in one molecule, such as isotridecyl isononanoate.

In addition to the various components described above, the oil-based ink may also include various additives, provided these additives do not impair the effects of the present invention. For example, additives such as nozzle blockage inhibitors, antioxidants, conductivity modifiers, viscosity modifiers, surface tension regulators, and oxygen absorbers and the like may be added as appropriate. There are no particular limitations on these additives, and materials typically used in this technical field may be used.

The ink can be produced by mixing the various components including the colorant and the non-aqueous solvent. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and most preferably about 10 mPa·s.

There are no particular limitations on the printing method used with the inkjet ink, and any of various printing systems, including a piezo system, electrostatic system or thermal system may be used, but a piezo system is preferred. In those cases where an inkjet recording device is used, the ink of the embodiments is preferably discharged from the inkjet head based on a digital signal, with the discharged ink droplets being adhered to a recording medium.

In the embodiments, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. The present invention is in no way limited by the following examples. Unless specifically stated otherwise, components that are common across multiple examples are the same components.

[Synthesis of Alkyl-Modified Silicones]

The formulations of alkyl-modified silicones are shown in Table 1.

The method for synthesizing an alkyl-modified silicone of general formula (1) in which m+n=0 and the number of carbon atoms in R (the C number)=12 is described below.

A four-necked flask was charged with 50 parts by mass of hexane, 10 parts by mass of 1,1,1,3,5,5,5-heptamethyltrisiloxane, and 8.3 parts by mass of 1-dodecene. Subsequently, 0.02 parts by mass of a platinum catalyst (1,3-divinyl-1,1,3,3-tetramethyldisiloxane platinum complex, manufactured by Sigma-Aldrich Corporation) was added dropwise to the flask, and the resulting mixture was stirred at room temperature for 2 to 3 hours. The reaction solvent (hexane) and any unreacted raw materials were then removed by distillation under reduced pressure to obtain the target substance.

With the exception of mixing the siloxane compound and the compound having an alkyl chain in the formulations shown in Table 1, the other alkyl-modified silicones were synthesized in a similar manner to above.

In the synthesis of each alkyl-modified silicone, mixing was performed so that the molar ratio between the siloxane compound and the compound having an alkyl chain was 1:1.1.

For each of the synthesized alkyl-modified silicones, the values for m, n, m+n and the number of carbon atoms in R (the C number) in general formula (1) are listed in Table 1.

The 1,1,1,3,5,5,5-heptamethyltrisiloxane and the compounds having an alkyl chain can be obtained from Tokyo Chemical Industry Co., Ltd.

TABLE 1

Formulations of alkyl-modified silicones

| Alkyl-modified silicone | | | | Siloxane compound | | Compound having alkyl chain | |
| --- | --- | --- | --- | --- | --- | --- | --- |
| m | n | m + n | C number of R | Raw material | Amount (parts by mass) | Raw material | Amount (parts by mass) |
| 0 | 0 | 0 | 4 | 1,1,1,3,5,5,5-heptamethyltrisiloxane | 10 | 1-butene | 2.8 |
| 0 | 0 | 0 | 6 | 1,1,1,3,5,5,5-heptamethyltrisiloxane | 10 | 1-hexene | 4.2 |
| 0 | 0 | 0 | 8 | 1,1,1,3,5,5,5-heptamethyltrisiloxane | 10 | 1-octene | 5.5 |
| 0 | 0 | 0 | 8 (branched) | 1,1,1,3,5,5,5-heptamethyltrisiloxane | 10 | 1-isooctene | 5.5 |
| 0 | 0 | 0 | 10 | 1,1,1,3,5,5,5-heptamethyltrisiloxane | 10 | 1-decene | 6.9 |
| 0 | 0 | 0 | 12 | 1,1,1,3,5,5,5-heptamethyltrisiloxane | 10 | 1-dodecene | 8.3 |
| 0 | 0 | 0 | 16 | 1,1,1,3,5,5,5-heptamethyltrisiloxane | 10 | 1-hexadecene | 11.1 |

TABLE 1-continued

Formulations of alkyl-modified silicones

| Alkyl-modified silicone | | | | Siloxane compound | | Compound having alkyl chain | |
|---|---|---|---|---|---|---|---|
| m | n | m + n | C number of R | Raw material | Amount (parts by mass) | Raw material | Amount (parts by mass) |
| 0 | 0 | 0 | 20 | 1,1,1,3,5,5,5-heptamethyltrisiloxane | 10 | 1-eicosene | 13.9 |
| 0 | 0 | 0 | 22 | 1,1,1,3,5,5,5-heptamethyltrisiloxane | 10 | 1-docosene | 15.3 |
| 1 | 0 | 1 | 12 | 1,1,1,3,5,5,7,7,7-nonamethyltetrasiloxane | 10 | 1-dodecene | 6.2 |
| 1 | 1 | 2 | 12 | 1,1,1,3,3,5,7,7,9,9,9-undecamethylpentasiloxane | 10 | 1-dodecene | 5.0 |
| 2 | 2 | 4 | 12 | 1,1,1,3,3,5,5,7,9,9,11,11,13,13,13-pentadecamethylheptasiloxane | 10 | 1-dodecene | 3.6 |

[Preparation of Inks]

Ink formulations are shown in Table 2, Table 3 and Table 4. The formulation of the solvent used in each ink is also shown in each table.

The pigments, pigment dispersants, and the various solvents shown in each of the tables were mixed together in accordance with the amounts shown in each table, and the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

With the exception of the points described below, inks of each of the examples and comparative examples were prepared in accordance with the above method.

In Example 3, the pigment and pigment dispersant were changed.

In Comparative Examples 3 and 4, a dimethyl silicone was used.

In Comparative Examples 6 and 7, a silicone-based solvent was not used, and a petroleum-based hydrocarbon solvent and a fatty acid ester-based solvent respectively were used.

The components used were as follows.
(Pigments)
Carbon black: MA77, manufactured by Mitsubishi Chemical Corporation.
Copper phthalocyanine blue: FASTOGEN Blue LA5380, manufactured by DIC Corporation.
(Pigment Dispersants)
Solsperse 18000: manufactured by The Lubrizol Corporation.
Solsperse 13940: manufactured by The Lubrizol Corporation.
(Comparative Solvents)
Dimethyl silicone: KF96L-1CS, a compound of general formula (1) in which m=0, n=0, m+n=0 and R=CH$_3$, manufactured by Shin-Etsu Chemical Co., Ltd.
Dimethyl silicone: KF-96A-6CS, a compound of general formula (1) in which m=0, n=7, m+n=7 and R=CH$_3$, manufactured by Shin-Etsu Chemical Co., Ltd.
Polyether-modified silicone: KF6015, manufactured by Shin-Etsu Chemical Co., Ltd.
Petroleum-based hydrocarbon solvent: MORESCO White P-60, a paraffin-based solvent, manufactured by MORESCO Corporation.
Fatty acid ester-based solvent: isotridecyl isononanoate, KAK139, manufactured by Kokyu Alcohol Kogyo Co., Ltd.

[Evaluations]

The inks from each of the examples and comparative examples described above were evaluated using the methods described below. The evaluation results are shown in Table 2, Table 3 and Table 4.
(Waviness of Clear File)

Evaluation of clear file waviness was performed by inserting a single printed item in a PP (polypropylene) clear file, leaving the clear file to stand, and after one week, ascertaining the amount of deformation in the clear file. The thickness of a single clear file sheet was 0.2 mm.

The printed item was prepared by loading the ink into a line-type inkjet printer "ORPHIS EX9050" (manufactured by RISO KAGAKU CORPORATION), and printing a solid image of about 51 mm in the main scanning direction (600 nozzles)×260 mm in the sub-scanning direction onto one side of a plain paper "RISO Paper Thin Type" (manufactured by RISO KAGAKU CORPORATION).

The amount of deformation in the clear file was determined by laying the clear file on a flat surface, and measuring the maximum height that the clear file had been deformed and lifted from the flat surface. The evaluation criteria were as follows.

S: the amount of deformation of the clear file is less than 1 cm

A: the amount of deformation of the clear file is at least 1 cm but less than 5 cm B: the amount of deformation of the clear file is at least 5 cm
(Wetting Characteristics of Ink on Nozzle Plate)

Each ink was placed in a 30 ml glass container, one end of a nozzle plate (length 5 cm×width 5 mm) used in an inkjet printer "ORPHIS EX9050" (a product name, manufactured by RISO KAGAKU CORPORATION) was grasped with a set of tweezers, and the opposite end of the nozzle plate was immersed in the ink to a depth of 2 cm for 5 seconds. Subsequently, the nozzle plate was pulled rapidly out of the ink, and the time t taken for the residual ink film on the nozzle plate to form ink droplets was measured. The same operation was repeated 10 times using the same nozzle plate, and the value of t was measured for each repetition. The average of the 10 t values was calculated and recorded as the ink repellency time. Using this ink repellency time, the wetting characteristics of the ink on the nozzle plate were evaluated against the following criteria.

S: ink repellency time of less than 3 seconds.

A: ink repellency time of at least 3 seconds but less than 5 seconds

B: ink repellency time of at least 5 seconds but less than 10 seconds

C: ink repellency time of at least 10 seconds (Discharge Performance)

Evaluation of the discharge performance was performed using a line-type inkjet printer "ORPHIS EX9050" (a product name, manufactured by RISO KAGAKU CORPORATION), by continuously printing 100 copies of a solid image on one side of a plain paper "RISO Paper Thin Type" (manufactured by RISO KAGAKU CORPORATION), and then evaluating the printed items visually.

The printing conditions were the same as those described above for the clear file waviness evaluation.

Ink discharge faults from the inkjet nozzles can be confirmed by the occurrence of unprinted portions that appear as white bands in the printed item. Whether or not these white bands appeared, and if present, how many bands occurred, within the 100 printed items was determined by visual inspection. The discharge performance was evaluated on the basis of the total number of white bands that were observed across the 100 printed items. The evaluation criteria were as follows.

S: no white bands
A: 1 or 2 white bands
B: 3 or 4 white bands
C: at least 5 white bands
D: the ink dispersion was unsatisfactory, and evaluation could not be performed Although a detailed description is not provided here, printing using the inks of each of the Examples was able to produce printed items of satisfactory print density.

TABLE 2

Ink formulations, solvent formulations and evaluation results of Examples

| Units: % by mass | | Example 1 | Example 2 | Example 3 | Example 4 |
|---|---|---|---|---|---|
| Pigment | Carbon black | 5.00 | 5.00 | — | 5.00 |
| | Copper phthalocyanine blue | — | — | 4.00 | — |
| Pigment dispersant | Solsperse 18000 | 5.00 | 5.00 | — | 5.00 |
| | Solsperse 13940 | — | — | 3.50 | — |
| Solvent | | 90.00 | 90.00 | 92.50 | 90.00 |
| Ink total (% by mass) | | 100.00 | 100.00 | 100.00 | 100.00 |

| | Units: % by mass | m + n | C number of R | Example 1 | Example 2 | Example 3 | Example 4 |
|---|---|---|---|---|---|---|---|
| Silicone-based solvents | Alkyl-modified silicones | 0 | 4 | — | — | — | — |
| | | 0 | 6 | — | — | — | — |
| | | 0 | 8 | — | — | — | — |
| | | 0 | 8 (branched) | — | — | — | — |
| | | 0 | 10 | 40.00 | — | — | — |
| | | 0 | 12 | — | 40.00 | 40.00 | 40.00 |
| | | 0 | 16 | — | — | — | — |
| | | 0 | 20 | — | — | — | — |
| | | 0 | 22 | — | — | — | — |
| | | 1 | 12 | — | — | — | — |
| | | 2 | 12 | — | — | — | — |
| | | 4 | 12 | — | — | — | — |
| | Dimethyl silicone KF96L-1CS | 0 | 1 | — | — | — | — |
| | Dimethyl silicone KF-96A-6CS | 7 | 1 | — | — | — | — |
| | Polyether-modified silicone | | | — | — | — | — |
| Other solvents | Petroleum-based hydrocarbon solvent: MORESCO White P-60 | | | 60.00 | 60.00 | 60.00 | — |
| | Fatty acid ester-based solvent: isotridecyl isononanoate | | | — | — | — | 60.00 |
| Solvent total (% by mass) | | | | 100.00 | 100.00 | 100.00 | 100.00 |
| Clear file waviness | | | | S | S | S | S |
| Wetting characteristics of ink on nozzle plate | | | | S | S | S | S |
| Discharge performance | | | | S | S | S | S |

| Units: % by mass | | Example 5 | Example 6 | Example 7 | Example 8 |
|---|---|---|---|---|---|
| Pigment | Carbon black | 5.00 | 5.00 | 5.00 | 5.00 |
| | Copper phthalocyanine blue | — | — | — | — |
| Pigment dispersant | Solsperse 18000 | 5.00 | 5.00 | 5.00 | 5.00 |
| | Solsperse 13940 | — | — | — | — |
| Solvent | | 90.00 | 90.00 | 90.00 | 90.00 |
| Ink total (% by mass) | | 100.00 | 100.00 | 100.00 | 100.00 |

| | Units: % by mass | m + n | C number of R | Example 5 | Example 6 | Example 7 | Example 8 |
|---|---|---|---|---|---|---|---|
| Silicone-based solvents | Alkyl-modified silicones | 0 | 4 | — | — | 40.00 | — |
| | | 0 | 6 | — | — | — | 40.00 |
| | | 0 | 8 | 40.00 | — | — | — |
| | | 0 | 8 (branched) | — | 40.00 | — | — |

TABLE 2-continued

Ink formulations, solvent formulations and evaluation results of Examples

| | | m + n | C number of R | | | | |
|---|---|---|---|---|---|---|---|
| | | 0 | 10 | — | — | — | — |
| | | 0 | 12 | — | — | — | — |
| | | 0 | 16 | — | — | — | — |
| | | 0 | 20 | — | — | — | — |
| | | 0 | 22 | — | — | — | — |
| | | 1 | 12 | — | — | — | — |
| | | 2 | 12 | — | — | — | — |
| | | 4 | 12 | — | — | — | — |
| | Dimethyl silicone KF96L-1CS | 0 | 1 | — | — | — | — |
| | Dimethyl silicone KF-96A-6CS | 7 | 1 | — | — | — | — |
| | Polyether-modified silicone | | | — | — | — | — |
| Other solvents | Petroleum-based hydrocarbon solvent: MORESCO White P-60 | | | 60.00 | 60.00 | 60.00 | 60.00 |
| | Fatty acid ester-based solvent: isotridecyl isononanoate | | | — | — | — | — |
| Solvent total (% by mass) | | | | 100.00 | 100.00 | 100.00 | 100.00 |
| Clear file waviness | | | | S | S | S | S |
| Wetting characteristics of ink on nozzle plate | | | | A | A | B | B |
| Discharge performance | | | | S | S | S | S |

TABLE 3

Ink formulations, solvent formulations and evaluation results of Examples

| | Units: % by mass | Example 9 | Example 10 | Example 11 | Example 12 | Example 13 |
|---|---|---|---|---|---|---|
| Pigment | Carbon black | 5.00 | 5.00 | 5.00 | 5.00 | 5.00 |
| | Copper phthalocyanine blue | — | — | — | — | — |
| Pigment dispersant | Solsperse 18000 | 5.00 | 5.00 | 5.00 | 5.00 | 5.00 |
| | Solsperse 13940 | — | — | — | — | — |
| Solvent | | 90.00 | 90.00 | 90.00 | 90.00 | 90.00 |
| Ink total (% by mass) | | 100.00 | 100.00 | 100.00 | 100.00 | 100.00 |

| | Units: % by mass | m + n | C number of R | Example 9 | Example 10 | Example 11 | Example 12 | Example 13 |
|---|---|---|---|---|---|---|---|---|
| Silicone-based solvents | Alkyl-modified silicones | 0 | 4 | — | — | — | — | — |
| | | 0 | 6 | — | — | — | — | — |
| | | 0 | 8 | — | — | — | — | — |
| | | 0 | 8 (branched) | — | — | — | — | — |
| | | 0 | 10 | — | — | — | — | — |
| | | 0 | 12 | — | — | — | — | 15.00 |
| | | 0 | 16 | 40.00 | — | — | — | — |
| | | 0 | 20 | — | 40.00 | — | — | — |
| | | 0 | 22 | — | — | — | — | — |
| | | 1 | 12 | — | — | 40.00 | — | — |
| | | 2 | 12 | — | — | — | 40.00 | — |
| | | 4 | 12 | — | — | — | — | — |
| | Dimethyl silicone KF96L-1CS | 0 | 1 | — | — | — | — | — |
| | Dimethyl silicone KF-96A-6CS | 7 | 1 | — | — | — | — | — |
| | Polyether-modified silicone | | | — | — | — | — | — |
| Other solvents | Petroleum-based hydrocarbon solvent: MORESCO White P-60 | | | 60.00 | 60.00 | 60.00 | 60.00 | 85.00 |
| | Fatty acid ester-based solvent: isotridecyl isononanoate | | | — | — | — | — | — |
| Solvent total (% by mass) | | | | 100.00 | 100.00 | 100.00 | 100.00 | 100.00 |
| Clear file waviness | | | | A | A | S | S | S |
| Wetting characteristics of ink on nozzle plate | | | | S | S | A | B | S |
| Discharge performance | | | | A | B | S | S | A |

| | Units: % by mass | Example 14 | Example 15 | Example 16 | Example 17 |
|---|---|---|---|---|---|
| Pigment | Carbon black | 5.00 | 5.00 | 5.00 | 5.00 |
| | Copper phthalocyanine blue | — | — | — | — |
| Pigment dispersant | Solsperse 18000 | 5.00 | 5.00 | 5.00 | 5.00 |
| | Solsperse 13940 | — | — | — | — |

TABLE 3-continued

Ink formulations, solvent formulations and evaluation results of Examples

| | | | | | | | |
|---|---|---|---|---|---|---|---|
| Solvent | | | | 90.00 | 90.00 | 90.00 | 90.00 |
| Ink total (% by mass) | | | | 100.00 | 100.00 | 100.00 | 100.00 |

| | Units: % by mass | m + n | C number of R | Example 14 | Example 15 | Example 16 | Example 17 |
|---|---|---|---|---|---|---|---|
| Silicone-based solvents | Alkyl-modified silicones | 0 | 4 | — | — | — | — |
| | | 0 | 6 | — | — | — | — |
| | | 0 | 8 | — | — | — | — |
| | | 0 | 8 (branched) | — | — | — | — |
| | | 0 | 10 | — | — | — | — |
| | | 0 | 12 | 25.00 | 55.00 | 80.00 | 100.00 |
| | | 0 | 16 | — | — | — | — |
| | | 0 | 20 | — | — | — | — |
| | | 0 | 22 | — | — | — | — |
| | | 1 | 12 | — | — | — | — |
| | | 2 | 12 | — | — | — | — |
| | | 4 | 12 | — | — | — | — |
| | Dimethyl silicone KF96L-1CS | 0 | 1 | — | — | — | — |
| | Dimethyl silicone KF-96A-6CS | 7 | 1 | — | — | — | — |
| | Polyether-modified silicone | | | — | — | — | — |
| Other solvents | Petroleum-based hydrocarbon solvent: MORESCO White P-60 | | | 75.00 | 45.00 | 20.00 | — |
| | Fatty acid ester-based solvent: isotridecyl isononanoate | | | — | — | — | — |
| Solvent total (% by mass) | | | | 100.00 | 100.00 | 100.00 | 100.00 |
| Clear file waviness | | | | S | S | S | S |
| Wetting characteristics of ink on nozzle plate | | | | S | S | A | B |
| Discharge performance | | | | S | S | S | S |

TABLE 4

Ink formulations, solvent formulations and evaluation results of Comparative Examples

| | Units: % by mass | Comparative Example 1 | Comparative Example 2 | Comparative Example 3 | Comparative Example 4 |
|---|---|---|---|---|---|
| Pigment | Carbon black | 5.00 | 5.00 | 5.00 | 5.00 |
| | Copper phthalocyanine blue | — | — | — | — |
| Pigment dispersant | Solsperse 18000 | 5.00 | 5.00 | 5.00 | 5.00 |
| | Solsperse 13940 | — | — | — | — |
| Solvent | | 90.00 | 90.00 | 90.00 | 90.00 |
| Ink total (% by mass) | | 100.00 | 100.00 | 100.00 | 100.00 |

| | Units: % by mass | m + n | C number of R | Comparative Example 1 | Comparative Example 2 | Comparative Example 3 | Comparative Example 4 |
|---|---|---|---|---|---|---|---|
| Silicone-based solvents | Alkyl-modified silicones | 0 | 4 | — | — | — | — |
| | | 0 | 6 | — | — | — | — |
| | | 0 | 8 | — | — | — | — |
| | | 0 | 8 (branched) | — | — | — | — |
| | | 0 | 10 | — | — | — | — |
| | | 0 | 12 | — | — | — | — |
| | | 0 | 16 | — | — | — | — |
| | | 0 | 20 | — | — | — | — |
| | | 0 | 22 | 40.00 | — | — | — |
| | | 1 | 12 | — | — | — | — |
| | | 2 | 12 | — | — | — | — |
| | | 4 | 12 | — | 40.00 | — | — |
| | Dimethyl silicone KF96L-1CS | 0 | 1 | — | — | 40.00 | — |
| | Dimethyl silicone KF-96A-6CS | 7 | 1 | — | — | — | 40.00 |
| | Polyether-modified silicone | | | — | — | — | — |

TABLE 4-continued

Ink formulations, solvent formulations and evaluation results of Comparative Examples

| Other solvents | Petroleum-based hydrocarbon solvent: MORESCO White P-60 | 60.00 | 60.00 | 60.00 | 60.00 |
|---|---|---|---|---|---|
| | Fatty acid ester-based solvent: isotridecyl isononanoate | — | — | — | — |
| Solvent total (% by mass) | | 100.00 | 100.00 | 100.00 | 100.00 |
| Clear file waviness | | B | S | S | S |
| Wetting characteristics of ink on nozzle plate | | S | C | C | C |
| Discharge performance | | C | A | S | S |

| | Units: % by mass | Comparative Example 5 | Comparative Example 6 | Comparative Example 7 | Comparative Example 8 |
|---|---|---|---|---|---|
| Pigment | Carbon black | 5.00 | 5.00 | 5.00 | 5.00 |
| | Copper phthalocyanine blue | — | — | — | — |
| Pigment dispersant | Solsperse 18000 | 5.00 | 5.00 | 5.00 | 5.00 |
| | Solsperse 13940 | — | — | — | — |
| Solvent | | 90.00 | 90.00 | 90.00 | 90.00 |
| Ink total (% by mass) | | 100.00 | 100.00 | 100.00 | 100.00 |

| | Units: % by mass | m + n | C number of R | Comparative Example 5 | Comparative Example 6 | Comparative Example 7 | Comparative Example 8 |
|---|---|---|---|---|---|---|---|
| Silicone-based solvents | Alkyl-modified silicones | 0 | 4 | — | — | — | — |
| | | 0 | 6 | — | — | — | — |
| | | 0 | 8 | — | — | — | — |
| | | 0 | 8 (branched) | — | — | — | — |
| | | 0 | 10 | — | — | — | — |
| | | 0 | 12 | — | — | — | 10.00 |
| | | 0 | 16 | — | — | — | — |
| | | 0 | 20 | — | — | — | — |
| | | 0 | 22 | — | — | — | — |
| | | 1 | 12 | — | — | — | — |
| | | 2 | 12 | — | — | — | — |
| | | 4 | 12 | — | — | — | — |
| | Dimethyl silicone KF96L-1CS | 0 | 1 | — | — | — | — |
| | Dimethyl silicone KF-96A-6CS | 7 | 1 | — | — | — | — |
| | Polyether-modified silicone | | | 40.00 | — | — | — |
| Other solvents | Petroleum-based hydrocarbon solvent: MORESCO White P-60 | | | 60.00 | 100.00 | — | 90.00 |
| | Fatty acid ester-based solvent: isotridecyl isononanoate | | | — | — | 100.00 | — |
| Solvent total (% by mass) | | | | 100.00 | 100.00 | 100.00 | 100.00 |
| Clear file waviness | | | | — | S | S | S |
| Wetting characteristics of ink on nozzle plate | | | | — | S | S | S |
| Discharge performance | | | | D | C | C | C |

As shown in the above tables, in the inks of the Examples, clear file deformation was prevented, and the wetting characteristics of the ink on the nozzle plate and the discharge performance were able to be improved.

Examples 1 to 10 confirmed that these effects were obtained for alkyl-modified silicones in which the alkyl chain had a carbon number of 4 to 20, with particularly superior effects obtained when this carbon number was 8 to 12.

If this carbon number was at least 8, then regardless of whether the alkyl chain was linear or branched, the wetting characteristics of the ink on the nozzle plate were able to further improved.

If this carbon number was not more than 16, and particularly 12 or fewer, then regardless of whether the alkyl chain was linear or branched, clear file deformation was better prevented, and the discharge performance was further improved.

Examples 11 and 12 are examples in which the value of m+n in the alkyl-modified silicone was 1 and 2 respectively, and the alkyl chain had a carbon number of 12, and satisfactory effects were able to be obtained in both examples.

Examples 1 and 13 to 17 are examples in which m+n=0, and in which the blend proportion of the alkyl-modified silicone having an R group with a carbon number of 12 relative to the total mass of the non-aqueous solvent was varied within a range from 15.00 to 100.00% by mass, and satisfactory effects were able to be obtained in all of these examples.

Ensuring that the amount of the alkyl-modified silicone relative to the total mass of the non-aqueous solvent was at least 25.00% by mass enabled the discharge performance to be further improved.

Ensuring that the amount of the alkyl-modified silicone relative to the total mass of the non-aqueous solvent was not more than 55.00% by mass enabled the wetting characteristics of the ink on the nozzle plate to be further improved.

In Comparative Example 1, the R group of the alkyl-modified silicone had a high carbon number of 22, and the discharge performance deteriorated.

In Comparative Example 2, the value of m+n in the alkyl-modified silicone was a high value of 4, and the wetting characteristics of the ink on the nozzle plate deteriorated.

Comparative Examples 3 and 4 are examples in which a dimethyl silicone was used, and the wetting characteristics of the ink on the nozzle plate deteriorated in both cases.

Comparative Example 5 is an example in which a polyether-modified silicone was used, and the discharge performance deteriorated.

Comparative Example 6 is an example in which only a petroleum-based hydrocarbon solvent was used for the solvent, and the discharge performance deteriorated.

Comparative Example 7 is an example in which only a fatty acid ester-based solvent was used for the solvent, and the discharge performance deteriorated.

Comparative Example 8 is an example in which the alkyl-modified silicone was used in an amount of 10.00% by mass relative to the total mass of the non-aqueous solvent, and the discharge performance deteriorated.

Production Example A

Inks prepared using alkyl-modified silicone oils are described below as a Production Example A.
[Synthesis of Alkyl-Modified Silicone Oils]

Formulations of alkyl-modified silicone oils are shown in Table A1. Details of the obtained alkyl-modified silicone oils are shown in Table A2.

A four-necked flask was charged with 50 parts by mass of hexane, together with a siloxane compound and a compound having an alkyl chain (alkene) in the blend proportions shown in Table A1. Subsequently, 0.02 parts by mass of a platinum catalyst (1,3-divinyl-1,1,3,3-tetramethyldisiloxane platinum complex, manufactured by Sigma-Aldrich Corporation) was added dropwise to the flask, and the resulting mixture was stirred at room temperature for 2 to 3 hours. The reaction solvent (hexane) and any unreacted raw materials were then removed by distillation under reduced pressure to obtain the target substance.

In the synthesis of each alkyl-modified silicone oil, mixing was performed so that the molar ratio between the siloxane compound and the alkene was 1:1.1, 1:2.2, or 1:3.3.

For each of the synthesized alkyl-modified silicone oils, the values for the Si number, the C number of the alkyl group, and the total C number for all of the alkyl groups in one molecule are listed in Table A2.

The siloxane compounds can be obtained from Gelest, Inc., and the alkenes can be obtained from Tokyo Chemical Industry Co., Ltd.

[Preparation and Evaluation of Inks]

The formulations and evaluation results of inks are shown in Table A3 to Table A6. The formulation of the solvent used in each ink is shown in the lower part of each table.

The inks were prepared in the same manner as described for the above Examples. Further, each ink was evaluated using the same evaluation methods and evaluation criteria as the above Examples.

TABLE A1

Solvent A formulations

| Solvent A | Siloxane compound (parts by mass) | | Alkene (parts by mass) | |
|---|---|---|---|---|
| | Raw material | Amount | Raw material | Amount |
| Solvent A1 | 1,1,1,3,3-pentamethyldisiloxane | 10.0 | 1-octene | 8.3 |
| Solvent A2 | 1,1,1,3,3-pentamethyldisiloxane | 10.0 | 1-dodecene | 12.5 |
| Solvent A3 | 1,1,3,3,5,5,5-heptamethyltrisiloxane | 10.0 | ethylene | 1.4 |
| Solvent A4 | 1,1,3,3,5,5,5-heptamethyltrisiloxane | 10.0 | 1-butene | 2.8 |
| Solvent A5 | 1,1,3,3,5,5,5-heptamethyltrisiloxane | 10.0 | 1-octene | 5.5 |
| Solvent A6 | 1,1,3,3,5,5,5-heptamethyltrisiloxane | 10.0 | 1-dodecene | 8.3 |
| Solvent A7 | 1,1,3,3,5,5,5-heptamethyltrisiloxane | 10.0 | 1-hexadecene | 11.1 |
| Solvent A8 | 1,1,3,3,5,5,5-heptamethyltrisiloxane | 10.0 | 1-eicosene | 13.9 |
| Solvent A9 | 1,1,3,3,5,5,5-heptamethyltrisiloxane | 10.0 | 1-docosene | 15.3 |
| Solvent A10 | 1,1,3,3-tetramethyldisiloxane | 10.0 | 1-butene | 9.2 |
| Solvent A11 | 1,1,3,3,5,5-hexamethyltrisiloxane | 10.0 | 1-butene | 5.9 |
| Solvent A12 | 1,1,3,3,5,5-hexamethyltrisiloxane | 10.0 | 1-hexene | 8.9 |
| Solvent A13 | 1,1,3,3,5,5-hexamethyltrisiloxane | 10.0 | 1-octene | 11.8 |
| Solvent A14 | 1,1,3,3,5,5,7,7-octamethyltetrasiloxane | 10.0 | 1-butene | 4.4 |
| Solvent A15 | 1,1,3,3,5,5,7,7,9,9-decamethylpentasiloxane | 10.0 | 1-butene | 3.5 |
| Solvent A16 | 1,1,1,3,5,5,5-heptamethyltrisiloxane | 10.0 | 1-butene | 2.8 |
| Solvent A17 | 1,1,1,3,5,5,5-heptamethyltrisiloxane | 10.0 | 1-octene | 5.5 |
| Solvent A18 | 1,1,1,3,5,5,5-heptamethyltrisiloxane | 10.0 | 1-hexadecene | 11.1 |
| Solvent A19 | 1,1,1,5,5,5-hexamethyl-3-(trimethylsilyloxy)trisiloxane | 10.0 | 1-octene | 4.2 |
| Solvent A20 | 1,1,1,5,5,5-hexamethyltrisiloxane | 10.0 | 1-butene | 5.9 |
| Solvent A21 | 1,1,1,5,5,5-hexamethyltrisiloxane | 10.0 | 1-hexene | 8.9 |
| Solvent A22 | 1,1,1,5,5,5-hexamethyltrisiloxane | 10.0 | 1-octene | 11.8 |
| Solvent A23 | 1,1,1,3,5,7,7,7-octamethyltetrasiloxane | 10.0 | 1-butene | 4.4 |
| Solvent A24 | 1,1,3,5,5-pentamethyl-3-(dimethylsilyloxy)trisiloxane | 10.0 | 1-butene | 6.9 |

TABLE A2

Solvent A Details

| Solvent A | Alkyl-modified silicone oil | Si number | C number of alkyl group R¹ | R² | R³ | Total C number of all alkyl groups in one molecule |
|---|---|---|---|---|---|---|
| Solvent A1 | | 2 | 8 | none | none | 8 |
| Solvent A2 | | 2 | 12 | none | none | 12 |
| Solvent A3 | | 3 | 12 | none | none | 2 |
| Solvent A4 | | 3 | 4 | none | none | 4 |
| Solvent A5 | | 3 | 8 | none | none | 8 |
| Solvent A6 | | 3 | 12 | none | none | 12 |
| Solvent A7 | | 3 | 16 | none | none | 16 |
| Solvent A8 | | 3 | 20 | none | none | 20 |
| Solvent A9 | | 3 | 22 | none | none | 22 |
| Solvent A10 | | 2 | 4 | 4 | none | 8 |
| Solvent A11 | | 3 | 4 | 4 | none | 8 |
| Solvent A12 | | 3 | 6 | 6 | none | 12 |
| Solvent A13 | | 3 | 8 | 8 | none | 16 |
| Solvent A14 | | 4 | 4 | 4 | none | 8 |
| Solvent A15 | | 5 | 4 | 4 | none | 8 |
| Solvent A16 | | 3 | 4 | none | none | 4 |
| Solvent A17 | | 3 | 8 | none | none | 8 |
| Solvent A18 | | 3 | 16 | none | none | 16 |
| Solvent A19 | | 4 | 8 | none | none | 8 |
| Solvent A20 | | 3 | 4 | 4 | none | 8 |
| Solvent A21 | | 3 | 6 | 6 | none | 12 |
| Solvent A22 | | 3 | 8 | 8 | none | 16 |
| Solvent A23 | | 4 | 4 | 4 | none | 8 |
| Solvent A24 | | 4 | 4 | 4 | 4 | 12 |

TABLE A3

| Ink formulations and evaluation results | | | | | | |
|---|---|---|---|---|---|---|
| | Units: % by mass | Example A1 | Example A2 | Example A3 | Example A4 | Example A5 |
| Pigment | Carbon black MA77 | 5.00 | 5.00 | 5.00 | 5.00 | 5.00 |
| | Copper phthalocyanine blue | | | | | |
| Dispersant | Solsperse 18000 | 5.00 | 5.00 | 5.00 | 5.00 | 5.00 |
| | Solsperse 13940 | | | | | |
| Solvent | | 90.00 | 90.00 | 90.00 | 90.00 | 90.00 |
| Ink total (% by mass) | | 100.00 | 100.00 | 100.00 | 100.00 | 100.00 |
| | Solvent composition | Example A1 | Example A2 | Example A3 | Example A4 | Example A5 |
| Silicone oils | Solvent A1 | 40.00 | | | | |
| | Solvent A2 | | 40.00 | | | |
| | Solvent A3 (comparison) | | | | | |
| | Solvent A4 | | | 40.00 | | |
| | Solvent A5 | | | | 40.00 | |
| | Solvent A6 | | | | | 40.00 |
| | Solvent A7 | | | | | |
| | Solvent A8 | | | | | |
| | Solvent A9 (comparison) | | | | | |
| Other solvent | MORESCO White P-60 | 60.00 | 60.00 | 60.00 | 60.00 | 60.00 |
| Solvent total (% by mass) | | 100.00 | 100.00 | 100.00 | 100.00 | 100.00 |
| Solvent A | Si number | 2 | 2 | 3 | 3 | 3 |
| | Number of alkyl groups | 1 | 1 | 1 | 1 | 1 |
| | C number of $R^1$ | 8 | 12 | 4 | 8 | 12 |
| | Total C number of all alkyl groups in one molecule | 8 | 12 | 4 | 8 | 12 |
| Clear file waviness | | A | A | S | S | S |
| Wetting characteristics of ink on nozzle plate | | S | S | B | A | S |
| Discharge performance | | S | S | S | S | S |

| | Units: % by mass | Example A6 | Example A7 | Comparative Example A1 | Comparative Example A2 |
|---|---|---|---|---|---|
| Pigment | Carbon black MA77 | 5.00 | 5.00 | 5.00 | 5.00 |
| | Copper phthalocyanine blue | | | | |
| Dispersant | Solsperse 18000 | 5.00 | 5.00 | 5.00 | 5.00 |
| | Solsperse 13940 | | | | |
| Solvent | | 90.00 | 90.00 | 90.00 | 90.00 |
| Ink total (% by mass) | | 100.00 | 100.00 | 100.00 | 100.00 |
| | Solvent composition | Example A6 | Example A7 | Comparative Example A1 | Comparative Example A2 |
| Silicone oils | Solvent A1 | | | | |
| | Solvent A2 | | | | |
| | Solvent A3 (comparison) | | | 40.00 | |
| | Solvent A4 | | | | |
| | Solvent A5 | | | | |
| | Solvent A6 | | | | |
| | Solvent A7 | 40.00 | | | |
| | Solvent A8 | | 40.00 | | |
| | Solvent A9 (comparison) | | | | 40.00 |
| Other solvent | MORESCO White P-60 | 60.00 | 60.00 | 60.00 | 60.00 |
| Solvent total (% by mass) | | 100.00 | 100.00 | 100.00 | 100.00 |
| Solvent A | Si number | 3 | 3 | 3 | 3 |
| | Number of alkyl groups | 1 | 1 | 1 | 1 |
| | C number of $R^1$ | 16 | 20 | 2 | 22 |
| | Total C number of all alkyl groups in one molecule | 16 | 20 | 2 | 22 |
| Clear file waviness | | A | A | S | B |
| Wetting characteristics of ink on nozzle plate | | S | S | C | S |
| Discharge performance | | A | B | S | C |

TABLE A4

Ink formulations and evaluation results

| | Units: % by mass | Example A8 | Example A9 | Example A10 | Example A11 | Example A12 | Example A13 |
|---|---|---|---|---|---|---|---|
| Pigment | Carbon black MA77 | 5.00 | 5.00 | 5.00 | 5.00 | 5.00 | 5.00 |
| | Copper phthalocyanine blue | | | | | | |
| Dispersant | Solsperse 18000 | 5.00 | 5.00 | 5.00 | 5.00 | 5.00 | 5.00 |
| | Solsperse 13940 | | | | | | |
| Solvent | | 90.00 | 90.00 | 90.00 | 90.00 | 90.00 | 90.00 |
| Ink total (% by mass) | | 100.00 | 100.00 | 100.00 | 100.00 | 100.00 | 100.00 |

| | Solvent composition | Example A8 | Example A9 | Example A10 | Example A11 | Example A12 | Example A13 |
|---|---|---|---|---|---|---|---|
| Silicone oils | Solvent A10 | 40.00 | | | | | |
| | Solvent A11 | | 40.00 | | | | |
| | Solvent A12 | | | 40.00 | | | |
| | Solvent A13 | | | | 40.00 | | |
| | Solvent A14 | | | | | 40.00 | |
| | Solvent A15 | | | | | | 40.00 |
| Other solvent | MORESCO White P-60 | 60.00 | 60.00 | 60.00 | 60.00 | 60.00 | 60.00 |
| Solvent total (% by mass) | | 100.0 | 100.00 | 100.00 | 100.00 | 100.00 | 100.00 |
| Solvent A | Si number | 2 | 3 | 3 | 3 | 4 | 5 |
| | Number of alkyl groups | 2 | 2 | 2 | 2 | 2 | 2 |
| | C number of $R^1$ | 4 | 4 | 6 | 8 | 4 | 4 |
| | C number of $R^2$ | 4 | 4 | 6 | 8 | 4 | 4 |
| | Total C number of all alkyl groups in one molecule | 8 | 8 | 12 | 16 | 8 | 8 |
| Clear file waviness | | A | S | S | A | S | S |
| Wetting characteristics of ink on nozzle plate | | S | A | S | S | A | B |
| Discharge performance | | S | S | S | A | S | A |

TABLE A5

Ink formulations and evaluation results

| | Units: % by mass | Example A14 | Example A15 | Example A16 | Example A17 | Example A18 |
|---|---|---|---|---|---|---|
| Pigment | Carbon black MA77 | 5.00 | 5.00 | 5.00 | 5.00 | 5.00 |
| | Copper phthalocyanine blue | | | | | |
| Dispersant | Solsperse 18000 | 5.00 | 5.00 | 5.00 | 5.00 | 5.00 |
| | Solsperse 13940 | | | | | |
| Solvent | | 90.00 | 90.00 | 90.00 | 90.00 | 90.00 |
| Ink total (% by mass) | | 100.00 | 100.00 | 100.00 | 100.00 | 100.00 |

| | Solvent composition | Example A14 | Example A15 | Example A16 | Example A17 | Example A18 |
|---|---|---|---|---|---|---|
| Silicone oils | Solvent A16 | 40.00 | | | | |
| | Solvent A17 | | 40.00 | | | |
| | Solvent A18 | | | 40.00 | | |
| | Solvent A19 | | | | 40.00 | |
| | Solvent A20 | | | | | 40.00 |
| | Solvent A21 | | | | | |
| | Solvent A22 | | | | | |
| | Solvent A23 | | | | | |
| | Solvent A24 | | | | | |
| Other solvent | MORESCO White P-60 | 60.00 | 60.00 | 60.00 | 60.00 | 60.00 |
| Solvent total (% by mass) | | 100.00 | 100.00 | 100.00 | 100.00 | 100.00 |
| Solvent A | Si number | 3 | 3 | 3 | 4 | 3 |
| | Number of alkyl groups | 1 | 1 | 1 | 1 | 2 |
| | C number of $R^1$ | 4 | 8 | 16 | 8 | 4 |
| | C number of $R^2$ | — | — | — | — | 4 |
| | C number of $R^3$ | — | — | — | — | — |
| | Total C number of all alkyl groups in one molecule | 4 | 8 | 16 | 8 | 8 |

TABLE A5-continued

Ink formulations and evaluation results

| | | | | | |
|---|---|---|---|---|---|
| Clear file waviness | S | S | A | S | S |
| Wetting characteristics of ink on nozzle plate | B | A | S | A | A |
| Discharge performance | S | S | A | S | S |

| | Units: % by mass | Example A19 | Example A20 | Example A21 | Example A22 |
|---|---|---|---|---|---|
| Pigment | Carbon black MA77 | 5.00 | 5.00 | 5.00 | 5.00 |
| | Copper phthalocyanine blue | | | | |
| Dispersant | Solsperse 18000 | 5.00 | 5.00 | 5.00 | 5.00 |
| | Solsperse 13940 | | | | |
| Solvent | | 90.00 | 90.00 | 90.00 | 90.00 |
| Ink total (% by mass) | | 100.00 | 100.00 | 100.00 | 100.00 |

| | Solvent composition | Example A19 | Example A20 | Example A21 | Example A22 |
|---|---|---|---|---|---|
| Silicone oils | Solvent A16 | | | | |
| | Solvent A17 | | | | |
| | Solvent A18 | | | | |
| | Solvent A19 | | | | |
| | Solvent A20 | | | | |
| | Solvent A21 | 40.00 | | | |
| | Solvent A22 | | 40.00 | | |
| | Solvent A23 | | | 40.00 | |
| | Solvent A24 | | | | 40.00 |
| Other solvent | MORESCO White P-60 | 60.00 | 60.00 | 60.00 | 60.00 |
| Solvent total (% by mass) | | 100.00 | 100.00 | 100.00 | 100.00 |
| Solvent A | Si number | 3 | 3 | 4 | 4 |
| | Number of alkyl groups | 2 | 2 | 2 | 3 |
| | C number of $R^1$ | 6 | 8 | 4 | 4 |
| | C number of $R^2$ | 6 | 8 | 4 | 4 |
| | C number of $R^3$ | — | — | — | 4 |
| | Total C number of all alkyl groups in one molecule | 12 | 16 | 8 | 12 |
| Clear file waviness | | S | A | S | S |
| Wetting characteristics of ink on nozzle plate | | S | S | A | A |
| Discharge performance | | S | A | S | A |

TABLE A6

Ink formulations and evaluation results

| | Units: % by mass | Example A23 | Example A24 | Example A25 | Example A26 | Example A27 | Example A28 | Example A29 |
|---|---|---|---|---|---|---|---|---|
| Pigment | Carbon black MA77 | 5.00 | 5.00 | 5.00 | 5.00 | 5.00 | | 5.00 |
| | Copper phthalocyanine blue | | | | | | 4.00 | |
| Dispersant | Solsperse 18000 | 5.00 | 5.00 | 5.00 | 5.00 | 5.00 | | 5.00 |
| | Solsperse 13940 | | | | | | 3.50 | |
| Solvent | | 90.00 | 90.00 | 90.00 | 90.00 | 90.00 | 92.50 | 90.00 |
| Ink total (% by mass) | | 100.00 | 100.00 | 100.00 | 100.00 | 100.00 | 100.00 | 100.00 |

| | Solvent composition | Example A23 | Example A24 | Example A25 | Example A26 | Example A27 | Example A28 | Example A29 |
|---|---|---|---|---|---|---|---|---|
| Silicone oil | Solvent A5 | 15.00 | 25.00 | 55.00 | 80.00 | 100.00 | 40.00 | 40.00 |
| Other solvents | MORESCO White P-60 | 85.00 | 75.00 | 45.00 | 20.00 | | 60.00 | |
| | Isotridecyl isononanoate | | | | | | | 60.00 |
| Solvent total (% by mass) | | 100.00 | 100.00 | 100.00 | 100.00 | 100.00 | 100.00 | 100.00 |
| Solvent A | Si number | 3 | 3 | 3 | 3 | 3 | 3 | 3 |

TABLE A6-continued

| | Ink formulations and evaluation results | | | | | | | |
|---|---|---|---|---|---|---|---|---|
| | Number of alkyl groups | 1 | 1 | 1 | 1 | 1 | 1 | 1 |
| | C number of $R^1$ | 8 | 8 | 8 | 8 | 8 | 8 | 8 |
| | Total C number of all alkyl groups in one molecule | 8 | 8 | 8 | 8 | 8 | 8 | 8 |
| Clear file waviness | | S | S | S | S | S | S | S |
| Wetting characteristics of ink on nozzle plate | | S | S | S | A | B | S | S |
| Discharge performance | | A | S | S | S | S | S | S |

As shown in the above tables, each of the inks from the Examples exhibited a favorable result for each evaluation. Although a detailed description is not provided here, printing using the inks of each of the Examples was able to produce printed items of satisfactory print density.

In Examples A1 to A7 and Comparative Examples A1 and A2, the solvents A1 to A9 that had an alkyl group at one terminal of the siloxane linkage of the main chain were used.

Based on Examples A1 to A7, it was evident that the clear file waviness decreased more when the Si number was 3 rather than 2. Further, when the carbon number of the alkyl group was at least 8, the ink repellency was superior. Furthermore, when the carbon number of the alkyl group was not more than 16, and particularly 12 or fewer, the dischargeability was particularly good.

In Comparative Example A1, the carbon number of the alkyl group was 2, and the ink repellency deteriorated.

In Comparative Example 2, the carbon number of the alkyl group was 22, and the discharge performance deteriorated, and significant clear file waviness was also observed.

In Examples A8 to A13, the solvents A10 to A15 having one alkyl group at each of the two terminals of the siloxane linkage of the main chain were used.

Based on Examples A8 to A13, it was evident that the clear file waviness decreased more when the Si number was 3 rather than 2. Further, when the Si number was 4 or fewer, and particularly 3 or fewer, the ink repellency was superior. Furthermore, when the carbon number of the alkyl group was not more than 12, or the Si number was 4 or fewer, the dischargeability was particularly good.

In Examples A14 to A17, the solvents A16 to 19 having a single alkyl group as a side chain on the siloxane linkage of the main chain were used.

In Examples A18 to A21, the solvents A20 to 23 having two alkyl groups as side chains on the siloxane linkage of the main chain were used.

In Example A22, the solvent A24 having three alkyl groups as side chains on the siloxane linkage of the main chain was used.

Based on Examples A14 to A17, it was evident that when the Si number was 3 or fewer, the clear file waviness was further reduced, when the carbon number of the alkyl group was 8 or greater or the Si number was 3 or fewer, the ink repellency was superior, and when the carbon number of the alkyl group was 8 or fewer, the dischargeability was particularly good.

Based on Examples A18 to A21, it was evident that when the Si number was 3 or fewer, the ink repellency was superior, and when the carbon number of the alkyl group was 6 or fewer, the clear file waviness was further reduced and the dischargeability improved.

In Examples A23 to A27, using the solvent A5 and varying the blend proportion of the solvent A5 confirmed that the clear file waviness could be reduced by using the solvent A5. Even when the entire ink solvent was the solvent A5, good ink repellency was obtained. Further, it was also confirmed that using the solvent A5 improved the dischargeability.

Even in the inks of Examples A28 and A29 in which various components were different, the effects of the solvent A5 were confirmed.

Production Example B

Inks prepared using ester-modified silicone oils are described below as a Production Example B.

[Synthesis of Ester-Modified Silicone Oils]

Formulations of ester-modified silicone oils are shown in Table B1. Details of the obtained ester-modified silicone oils are shown in Table B2.

A three-necked flask was charged with 50 parts by mass of hexane, and then a siloxane compound and a vinyl compound in the blend proportions shown in Table B1. Subsequently, 0.02 parts by mass of platinum(0)-2,4,6,8-tetramethyl-2,4,6,8-tetravinylcyclotetrasiloxane complex (manufactured by Wako Pure Chemical Industries, Ltd.) was added to the flask, and the resulting mixture was stirred at room temperature for about 3 hours. The hexane that acted as the reaction solvent and any unreacted raw materials were then removed by distillation under reduced pressure to obtain the target substance.

In the synthesis of each ester-modified silicone oil, mixing was performed so that the molar ratio between the siloxane compound and the vinyl compound was 1:1.1 or 1:2.2.

For each of the synthesized ester-modified silicone oils, the values for the Si number, the number of carboxylate ester linkage-containing groups (shown as $R^B$ in the table), and the total of the C number and the O number for all the carboxylate ester linkage-containing groups ($R^B$) in one molecule are listed in Table B2.

The siloxane compounds can be obtained from Wako Pure Chemical Industries, Ltd., Tokyo Chemical Industry Co., Ltd. and Gelest, Inc., and the vinyl compounds can be obtained from Tokyo Chemical Industry Co., Ltd.

[Preparation and Evaluation of Inks]

The formulations and evaluation results of inks are shown in Table B3 and Table B4. The formulation of the solvent used in each ink is shown in the lower part of each table.

The inks were prepared in the same manner as described for the above Examples. Further, each ink was evaluated using the same evaluation methods and evaluation criteria as the above Examples.

TABLE B1

Solvent B formulations

| Solvent B | Siloxane compound Raw material | Amount (parts by mass) | Vinyl compound Raw material | Amount (parts by mass) |
|---|---|---|---|---|
| Solvent B1 | (1) 1,1,1,3,3-pentamethyldisiloxane | 10.0 | (5) vinyl hexanoate | 10.5 |
| Solvent B2 | (2) 1,1,1,3,5,5,5-heptamethyltrisiloxane | 10.0 | (1) vinyl acetate | 4.3 |
| Solvent B3 | (2) 1,1,1,3,5,5,5-heptamethyltrisiloxane | 10.0 | (2) vinyl propionate | 4.9 |
| Solvent B4 | (2) 1,1,1,3,5,5,5-heptamethyltrisiloxane | 10.0 | (3) vinyl butyrate | 5.6 |
| Solvent B5 | (2) 1,1,1,3,5,5,5-heptamethyltrisiloxane | 10.0 | (4) vinyl pivalate | 6.3 |
| Solvent B6 | (2) 1,1,1,3,5,5,5-heptamethyltrisiloxane | 10.0 | (5) vinyl hexanoate | 7.0 |
| Solvent B7 | (2) 1,1,1,3,5,5,5-heptamethyltrisiloxane | 10.0 | (6) vinyl 2-ethylhexanoate | 8.4 |
| Solvent B8 | (2) 1,1,1,3,5,5,5-heptamethyltrisiloxane | 10.0 | (7) vinyl decanoate | 9.8 |
| Solvent B9 | (2) 1,1,1,3,5,5,5-heptamethyltrisiloxane | 10.0 | (8) vinyl laurate | 11.2 |
| Solvent B10 | (3) 1,1,3,3,5,5-hexamethyltrisiloxane | 10.0 | (1) vinyl acetate | 9.1 |
| Solvent B11 | (4) 1,1,3,3,5,5-heptamethyltrisiloxane | 10.0 | (4) vinyl pivalate | 6.3 |
| Solvent B12 | (5) 1,1,1,5,5,5-hexamethyl-3-(trimethylsilyloxy)trisiloxane | 10.0 | (2) vinyl propionate | 3.7 |
| Solvent B13 | (6) 1,1,1,3,5,7,7,7-octamethyltetrasiloxane | 10.0 | (1) vinyl acetate | 6.7 |
| Solvent B14 | (2) 1,1,1,3,5,5,5-heptamethyltrisiloxane | 10.0 | (9) vinyl myristate | 12.6 |
| Solvent B15 | (2) 1,1,1,3,5,5,5-heptamethyltrisiloxane | 10.0 | (10) vinyl palmitate | 14.0 |
| Solvent B16 | (2) 1,1,1,3,5,5,5-heptamethyltrisiloxane | 10.0 | (11) vinyl stearate | 15.4 |
| Solvent B17 | (7) 1,1,3,3,5,5,7,7,9,9-decamethylpentasiloxane | 10.0 | (1) vinyl acetate | 5.4 |
| Solvent B18 | (8) 1,1,3,3,5,5,7,7,9,9,11,11-dodecamethylhexasiloxane | 10.0 | (1) vinyl acetate | 4.4 |

TABLE B2

Solvent B Details
The vinyl compound is bonded at H of the siloxane compound to introduce $R^B$. $R^B$ represents —C—O—(CO)—R, wherein R is an alkyl group.

| Solvent B | Siloxane compound Vinyl compound | Siloxane compound | Si number | Number of $R^B$ groups | Total of C number and O number in $R^B$ (C + O) | Total of C number and O number for all $R^B$ groups in one molecule |
|---|---|---|---|---|---|---|
| Solvent B1 | (1) 1,1,1,3,3-pentamethyldisiloxane<br>(5) vinyl hexanoate | $(Me)_2Si(H)$—O—$Si(Me)_3$ | 2 | 1 | C: 8; O: 2<br>total: 10 | 10 |
| Solvent B2 | (2) 1,1,1,3,5,5,5-heptamethyltrisiloxane<br>(1) vinyl acetate | Me-Si(Me)-O-Si(Me)(H)-O-Si(Me)-Me (trisiloxane structure) | 3 | 1 | C: 4; O: 2<br>total: 6 | 6 |
| Solvent B3 | (2) 1,1,1,3,5,5,5-heptamethyltrisiloxane<br>(2) vinyl propionate | | 3 | 1 | C: 5; O: 2<br>total: 7 | 7 |
| Solvent B4 | (2) 1,1,1,3,5,5,5-heptamethyltrisiloxane<br>(3) vinyl butyrate | | 3 | 1 | C: 6; O: 2<br>total: 8 | 8 |
| Solvent B5 | (2) 1,1,1,3,5,5,5-heptamethyltrisiloxane<br>(4) vinyl pivalate | | 3 | 1 | C7: O: 2<br>total: 9 | 9 |
| Solvent B6 | (2) 1,1,1,3,5,5,5-heptamethyltrisiloxane<br>(5) vinyl hexanoate | | 3 | 1 | C8: O: 2<br>total: 10 | 10 |
| Solvent B7 | (2) 1,1,1,3,5,5,5-heptamethyltrisiloxane<br>(6) vinyl 2-ethylhexanoate | | 3 | 1 | C: 10; O: 2<br>total: 12 | 12 |
| Solvent B8 | (2) 1,1,1,3,5,5,5-heptamethyltrisiloxane<br>(7) vinyl decanoate | | 3 | 1 | C: 12 O: 2<br>total: 14 | 14 |
| Solvent B9 | (2) 1,1,1,3,5,5,5-heptamethyltrisiloxane<br>(8) vinyl laurate | | 3 | 1 | C: 14; O: 2<br>total: 16 | 16 |
| Solvent B10 | (3) 1,1,3,3,5,5-hexamethyltrisiloxane<br>(1) vinyl acetate | Me-Si(Me)(H)-O-Si(Me)(Me)-O-Si(Me)(H)-Me | 3 | 2 | C: 4; O: 2<br>total: 6 | 12 |
| Solvent B11 | (4) 1,1,3,3,5-heptamethyltrisiloxane<br>(4) vinyl pivalate | Me-Si(Me)(Me)-O-Si(Me)(Me)-O-Si(Me)(H)-Me | 3 | 1 | C: 7; O: 2<br>total: 9 | 9 |

TABLE B2-continued

Solvent B Details
The vinyl compound is bonded at H of the siloxane compound to introduce $R^B$. $R^B$ represents —C—O—(CO)—R, wherein R is an alkyl group.

| Solvent B | Siloxane compound / Vinyl compound | Siloxane compound | Si number | Number of $R^B$ groups | Total of C number and O number in $R^B$ (C + O) | Total of C number and O number for all $R^B$ groups in one molecule |
|---|---|---|---|---|---|---|
| Solvent B12 | (5) 1,1,1,5,5,5-hexamethyl-3-(trimethylsilyloxy)trisiloxane / (2) vinyl propionate | 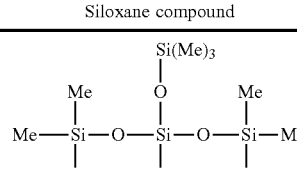 | 4 | 1 | C: 5; O: 2 total: 7 | 7 |
| Solvent B13 | (6) 1,1,1,3,5,7,7,7-octamethyltetrasiloxane / (1) vinyl acetate | 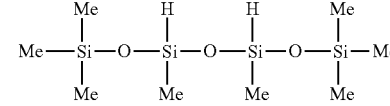 | 4 | 2 | C: 4; O: 2 total: 6 | 12 |
| Solvent B14 | (2) 1,1,1,3,5,5,5-heptamethyltrisiloxane / (9) vinyl myristate | 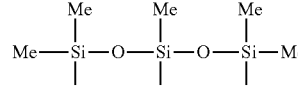 | 3 | 1 | C: 16; O: 2 total: 18 | 18 |
| Solvent B15 | (2) 1,1,1,3,5,5,5-heptamethyltrisiloxane / (10) vinyl palmitate | | 3 | 1 | C: 18; O: 2 total: 20 | 20 |
| Solvent B16 | (2) 1,1,1,3,5,5,5-heptamethyltrisiloxane / (11) vinyl stearate | | 3 | 1 | C: 20; O: 2 total: 22 | 22 |
| Solvent B17 | (7) 1,1,3,3,5,5,7,7,9,9-decamethylpentasiloxane / (1) vinyl acetate | 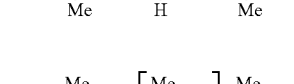 | 5 | 2 | C: 4; O: 2 total: 6 | 12 |
| Solvent B18 | (8) 1,1,3,3,5,5,7,7,9,9,11,11-dodecamethylhexasiloxane / (1) vinyl acetate | 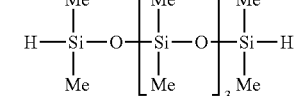 | 6 | 2 | C: 4; O: 2 total: 6 | 12 |

*Me represents a methyl group.

TABLE B3

Ink formulations and evaluation results

| | Units: % by mass | Example B1 | Example B2 | Example B3 | Example B4 | Example B5 |
|---|---|---|---|---|---|---|
| Pigment | Carbon black MA77 | 5.00 | 5.00 | 5.00 | 5.00 | 5.00 |
| | Carbon black NEROX500 | | | | | |
| Dispersant | Solsperse 18000 | 5.00 | 5.00 | 5.00 | 5.00 | 5.00 |
| | Solsperse 17000 | | | | | |
| Solvent | | 90.00 | 90.00 | 90.00 | 90.00 | 90.00 |
| Ink total (% by mass) | | 100.00 | 100.00 | 100.00 | 100.00 | 100.00 |

| | Solvent composition | Example B1 | Example B2 | Example B3 | Example B4 | Example B5 |
|---|---|---|---|---|---|---|
| Silicone oils | Solvent B1 | 40.00 | | | | |
| | Solvent B2 | | 40.00 | | | |
| | Solvent B3 | | | 40.00 | | |
| | Solvent B4 | | | | 40.00 | |
| | Solvent B5 | | | | | 40.00 |
| | Solvent B6 | | | | | |
| | Solvent B7 | | | | | |
| | Solvent B8 | | | | | |
| | Solvent B9 | | | | | |
| Other solvent | MORESCO White P-60 | 60.00 | 60.00 | 60.00 | 60.00 | 60.00 |
| Solvent total (% by mass) | | 100.00 | 100.00 | 100.00 | 100.00 | 100.00 |

TABLE B3-continued

Ink formulations and evaluation results

| | | | | | | |
|---|---|---|---|---|---|---|
| Solvent B | Si number | 2 | 3 | 3 | 3 | 3 |
| | Number of $R^B$ groups | 1 | 1 | 1 | 1 | 1 |
| | C number + O number for $R^B$ | 10 | 6 | 7 | 8 | 9 |
| | Total C number + O number for all $R^B$ groups in one molecule | 10 | 6 | 7 | 8 | 9 |
| Clear file waviness | | A | S | S | S | S |
| Wetting characteristics of ink on nozzle plate | | S | A | S | S | S |
| Discharge performance | | S | S | S | S | S |

| | Units: % by mass | Example B6 | Example B7 | Example B8 | Example B9 |
|---|---|---|---|---|---|
| Pigment | Carbon black MA77 | 5.00 | 5.00 | 5.00 | 5.00 |
| | Carbon black NEROX500 | | | | |
| Dispersant | Solsperse 18000 | 5.00 | 5.00 | 5.00 | 5.00 |
| | Solsperse 17000 | | | | |
| Solvent | | 90.00 | 90.00 | 90.00 | 90.00 |
| Ink total (% by mass) | | 100.00 | 100.00 | 100.00 | 100.00 |

| | Solvent composition | Example B6 | Example B7 | Example B8 | Example B9 |
|---|---|---|---|---|---|
| Silicone oils | Solvent B1 | | | | |
| | Solvent B2 | | | | |
| | Solvent B3 | | | | |
| | Solvent B4 | | | | |
| | Solvent B5 | | | | |
| | Solvent B6 | 40.00 | | | |
| | Solvent B7 | | 40.00 | | |
| | Solvent B8 | | | 40.00 | |
| | Solvent B9 | | | | 40.00 |
| Other solvent | MORESCO White P-60 | 60.00 | 60.00 | 60.00 | 60.00 |
| Solvent total (% by mass) | | 100.00 | 100.00 | 100.00 | 100.00 |
| Solvent B | Si number | 3 | 3 | 3 | 3 |
| | Number of $R^B$ groups | 1 | 1 | 1 | 1 |
| | C number + O number for $R^B$ | 10 | 12 | 14 | 16 |
| | Total C number + O number for all $R^B$ groups in one molecule | 10 | 12 | 14 | 16 |
| Clear file waviness | | S | S | A | A |
| Wetting characteristics of ink on nozzle plate | | S | S | S | S |
| Discharge performance | | S | S | A | A |

TABLE B4

Ink formulations and evaluation results

| | Units: % by mass | Example B10 | Example B11 | Example B12 | Example B13 | Example B14 | Example B15 |
|---|---|---|---|---|---|---|---|
| Pigment | Carbon black MA77 | 5.00 | 5.00 | 5.00 | 5.00 | | 5.00 |
| | Carbon black NEROX500 | | | | | 10.00 | |
| Dispersant | Solsperse 18000 | 5.00 | 5.00 | 5.00 | 5.00 | | 5.00 |
| | Solsperse 17000 | | | | | 10.00 | |
| Solvent | | 90.00 | 90.00 | 90.00 | 90.00 | 80.00 | 90.00 |
| Ink total (% by mass) | | 100.00 | 100.00 | 100.00 | 100.00 | 100.00 | 100.00 |

| | Solvent composition | Example B10 | Example B11 | Example B12 | Example B13 | Example B14 | Example B15 |
|---|---|---|---|---|---|---|---|
| Silicone oils | Solvent B6 | | | | | | |
| | Solvent B10 | 40.00 | | | | | |
| | Solvent B11 | | 40.00 | | | | |
| | Solvent B12 | | | 40.00 | | | |
| | Solvent B13 | | | | 40.00 | 50.00 | |
| | Solvent B14 | | | | | | |
| | Solvent B15 | | | | | | 40.00 |
| | Solvent B16 (comparison) | | | | | | |
| | Solvent B17 | | | | | | |
| | Solvent B18 | | | | | | |

TABLE B4-continued

| | Ink formulations and evaluation results | | | | | | |
|---|---|---|---|---|---|---|---|
| Other solvents | MORESCO White P-60 | 60.00 | 60.00 | 60.00 | 60.00 | | 60.00 |
| | MORESCO White P-70 | | | | | 37.50 | |
| | Octadecanol | | | | | 12.50 | |
| Solvent total (% by mass) | | 100.00 | 100.00 | 100.00 | 100.00 | 100.00 | 100.00 |
| Solvent B | Si number | 3 | 3 | 4 | 4 | 4 | 3 |
| | Number of $R^B$ groups | 2 | 1 | 1 | 2 | 2 | 1 |
| | C number + O number for $R^B$ | 6 | 9 | 7 | 6 | 6 | 18 |
| | Total C number + O number for all $R^B$ groups in one molecule | 12 | 9 | 7 | 12 | 12 | 18 |
| Clear file waviness | | S | S | S | S | S | A |
| Wetting characteristics of ink on nozzle plate | | S | S | A | A | A | S |
| Discharge performance | | S | S | S | A | A | B |

| | Units: % by mass | Example B16 | Example B17 | Example B18 | Example B19 | Comparative Example B1 |
|---|---|---|---|---|---|---|
| Pigment | Carbon black MA77 | 5.00 | 5.00 | 5.00 | 5.00 | 5.00 |
| | Carbon black NEROX500 | | | | | |
| Dispersant | Solsperse 18000 | 5.00 | 5.00 | 5.00 | 5.00 | 5.00 |
| | Solsperse 17000 | | | | | |
| Solvent | | 90.00 | 90.00 | 90.00 | 90.00 | 90.00 |
| Ink total (% by mass) | | 100.00 | 100.00 | 100.00 | 100.00 | 100.00 |

| | Solvent composition | Example B16 | Example B17 | Example B18 | Example B19 | Comparative Example B1 |
|---|---|---|---|---|---|---|
| Silicone oils | Solvent B6 | | | | 100.00 | |
| | Solvent B10 | | | | | |
| | Solvent B11 | | | | | |
| | Solvent B12 | | | | | |
| | Solvent B13 | | | | | |
| | Solvent B14 | | | | | |
| | Solvent B15 | 40.00 | | | | |
| | Solvent B16 (comparison) | | | | | 40.00 |
| | Solvent B17 | | | 40.00 | | |
| | Solvent B18 | | 40.00 | | | |
| Other solvents | MORESCO White P-60 | 60.00 | 60.00 | 60.00 | | 60.00 |
| | MORESCO White P-70 | | | | | |
| | Octadecanol | | | | | |
| Solvent total (% by mass) | | 100.00 | 100.00 | 100.00 | 100.00 | 100.00 |
| Solvent B | Si number | 3 | 6 | 5 | 3 | 3 |
| | Number of $R^B$ groups | 1 | 2 | 2 | 1 | 1 |
| | C number + O number for $R^B$ | 20 | 6 | 6 | 10 | 22 |
| | Total C number + O number for all $R^B$ groups in one molecule | 20 | 12 | 12 | 10 | 22 |
| Clear file waviness | | A | S | S | S | A |
| Wetting characteristics of ink on nozzle plate | | S | A | A | B | S |
| Discharge performance | | B | B | A | S | C |

For the solvents B1 to B18 shown in the tables, ester-modified silicone oils having a carboxylate ester linkage-containing group represented by —(CH$_2$)$_2$—O—(CO)—R were used.

As shown in each of the above tables, each of the inks from the Examples exhibited a favorable result for each evaluation. Although a detailed description is not provided here, printing using the inks of each of the Examples was able to produce printed items of satisfactory print density.

In Example B1, the solvent B1 having a Si number of 2, and having one carboxylate ester linkage-containing group ($R^B$) in which the total of the C number and the O number was 10 was used, and satisfactory effects were obtained.

In Examples B2 to B9, the solvents B2 to B9 that had one carboxylate ester linkage-containing group introduced at position-3 Si of a trisiloxane were used.

Based on Examples B2 to B9, it was evident that when the total of the C number and the O number for the carboxylate ester linkage-containing group was 12 or fewer, clear file deformation could be further reduced, when the total of the C number and the O number for the carboxylate ester linkage-containing group was 7 or greater, the ink repellency was more favorable, and when the total of the C number and the O number for the carboxylate ester linkage-containing group was 12 or fewer, the dischargeability was superior.

In Examples B9 to B18, the solvents B9 to B18 were used.

Based on Examples B9 to B18, it was evident that the dischargeability tended to be more favorable when the total of the C number and the O number for the carboxylate ester linkage-containing group was 16 or fewer. Further, when the Si number was not more than 5, and particularly 3 or fewer, the ink repellency tended to be more favorable.

In Example B19, the solvent B6 was used in an amount of 90% by mass relative to the total mass of the ink solvent, and both the clear file deformation and the dischargeability improved, and satisfactory ink repellency was obtained.

In Comparative Example B1, the solvent B16 for which the total of the C number and the O number in the carboxylate ester linkage-containing group was 22 was used, and the dischargeability deteriorated.

Production Example C

Inks prepared using aryl-modified silicone oils are described below as a Production Example C.

[Synthesis of Aryl-Modified Silicone Oils]

Formulations of aryl-modified silicone oils are shown in Table C1. Details of the obtained aryl-modified silicone oils are shown in Table C2.

The solvent C1 was a commercially available product (manufactured by Tokyo Chemical Industry Co., Ltd.).

For the solvents C2 to C6, a four-necked flask was charged with 50 parts by mass of hexane, together with a siloxane compound and a compound having an aryl group in the blend proportions shown in Table C1. Subsequently, 0.02 parts by mass of a platinum catalyst (1,3-divinyl-1,1,3,3-tetramethyldisiloxane platinum complex, manufactured by Sigma-Aldrich Corporation) was added dropwise to the flask, and the resulting mixture was stirred at room temperature for 2 to 3 hours. The reaction solvent (hexane) and any unreacted raw materials were then removed by distillation under reduced pressure to obtain the target substance.

In the synthesis of each aryl-modified silicone oil, mixing was performed so that the molar ratio between the siloxane compound and the compound having an aryl group was 1:1.1, 1:2.2, or 1:3.3.

For each synthesized aryl-modified silicone oil, the Si number, the number of aryl groups, and the total C number for all the aryl groups in one molecule are listed in Table C2.

The siloxane compounds and the compounds having an aryl group can be obtained from Tokyo Chemical Industry Co., Ltd.

[Preparation and Evaluation of Inks]

The formulations and evaluation results of inks are shown in Table C3. The formulation of the solvent used in each ink is shown in the lower part of each table.

The inks were prepared in the same manner as described for the above Examples. Further, each ink was evaluated using the same evaluation methods and evaluation criteria as the above Examples.

TABLE C1

Solvent C formulations

| Solvent C | Siloxane compound (parts by mass) | | Compound having an aryl group (parts by mass) | |
|---|---|---|---|---|
| | Raw material | Amount | Raw material | Amount |
| Solvent C1 | (1) 1,1,1,5,5,5-hexamethyl-3-phenyl-3-(trimethylsilyloxy)trisiloxane | 10.0 | none | 0.0 |
| Solvent C2 | (2) 1,1,1,3,5,5,5-heptamethyltrisiloxane | 10.0 | (1) allylbenzene | 5.8 |
| Solvent C3 | (2) 1,1,1,3,5,5,5-heptamethyltrisiloxane | 10.0 | (2) β-methylstyrene | 5.8 |
| Solvent C4 | (2) 1,1,1,3,5,5,5-heptamethyltrisiloxane | 10.0 | (3) 4-phenyl-1-butene | 6.5 |
| Solvent C5 | (3) 1,1,3,3,5,5-hexamethyltrisiloxane | 10.0 | (3) 4-phenyl-1-butene | 14.0 |
| Solvent C6 | (4) 1,1,3,5,5-pentamethyl-3-(dimethylsilyloxy)trisiloxane | 10.0 | (3) 4-phenyl-1-butene | 16.2 |

TABLE C2

Solvent C details $$R^3-\underset{\underset{CH_3}{|}}{\overset{\overset{CH_3}{|}}{Si}}-O-\underset{\underset{R^1}{|}}{\overset{\overset{R^2}{|}}{Si}}-O-\underset{\underset{CH_3}{|}}{\overset{\overset{CH_3}{|}}{Si}}-R^4$$

| Solvent C | Siloxane compound/ Compound having an aryl group | Si number/ Number of $R^C$ groups | $R^1$ | $R^2$ | $R^3$ | $R^4$ | C number: $R^C$/all $R^C$ groups in one molecule |
|---|---|---|---|---|---|---|---|
| Solvent C1 | (1) 1,1,1,5,5,5-hexamethyl-3-phenyl-3-(trimethylsilyloxy)trisiloxane/ | 4 | Ph | —O—Si(Me)$_2$ | Me | Me | 6 |
| | none | 1 | | | | | 6 |
| Solvent C2 | (2) 1,1,1,3,5,5,5-heptamethyltrisiloxane/ | 3 | —(CH$_2$)$_3$—Ph | Me | Me | Me | 9 |
| | (1) allylbenzene | 1 | | | | | 9 |
| Solvent C3 | (2) 1,1,1,3,5,5,5-heptamethyltrisiloxane/ | 3 | —CH$_2$—CH(CH$_3$)—Ph | Me | Me | Me | 9 |
| | (2) β-methylstyrene | 1 | | | | | 9 |
| Solvent C4 | (2) 1,1,1,3,5,5,5-heptamethyltrisiloxane/ | 3 | —(CH$_2$)$_4$—Ph | Me | Me | Me | 10 |
| | (3) 4-phenyl-1-butene | 1 | | | | | 10 |
| Solvent C5 | (3) 1,1,3,3,5,5-hexamethyltrisiloxane/ | 3 | Me | Me | —(CH$_2$)$_4$—Ph | —(CH$_2$)$_4$—Ph | 10 |
| | (3) 4-phenyl-1-butene × 2 | 2 | | | | | 20 |
| Solvent C6 | (4) 3-[(dimethylsilyl)oxy]-1,1,3,5,5-pentamethyltrisiloxane/ | 4 | —O—Si(Me)$_2$((CH$_2$)$_2$—Ph) | Me | —(CH$_2$)$_4$—Ph | —(CH$_2$)$_4$—Ph | 10 |
| | (3) 4-phenyl-1-butene × 3 | 3 | | | | | 30 |

$R^C$ represents an aromatic ring-containing group, Me represents a methyl group, and Ph represents a phenyl group.

TABLE C3

Ink formulations and evaluation results

| Units: % by mass | | Example C1 | Example C2 | Example C3 | Example C4 | Example C5 | Example C6 | Comparative Example C1 | Comparative Example C2 |
|---|---|---|---|---|---|---|---|---|---|
| Pigment | Carbon black MA77 | 5.00 | 5.00 | 5.00 | 5.00 | 5.00 | | 5.00 | 5.00 |
| | Copper phthalocyanine blue | | | | | | 5.00 | | |
| Dispersant | Solsperse 18000 | 5.00 | 5.00 | 5.00 | 5.00 | 5.00 | | 5.00 | 5.00 |
| | Solsperse 13940 | | | | | | 5.00 | | |
| Solvent | | 90.00 | 90.00 | 90.00 | 90.00 | 90.00 | 90.00 | 90.00 | 90.00 |
| Ink total (% by mass) | | 100.00 | 100.00 | 100.00 | 100.00 | 100.00 | 100.00 | 100.00 | 100.00 |

| Solvent composition | | Example C1 | Example C2 | Example C3 | Example C4 | Example C5 | Example C6 | Comparative Example C1 | Comparative Example C2 |
|---|---|---|---|---|---|---|---|---|---|
| Silicone oils | Solvent C1 | 40.00 | | | | | | | |
| | Solvent C2 | | 40.00 | | | | | | |
| | Solvent C3 | | | 40.00 | | | | | |
| | Solvent C4 | | | | 40.00 | | 40.00 | | 10.00 |
| | Solvent C5 | | | | | 40.00 | | | |
| | Solvent C6 | | | | | | | 40.00 | |
| Other solvent | MORESCO White P-60 | 60.00 | 60.00 | 60.00 | 60.00 | 60.00 | 60.00 | 60.00 | 90.00 |
| Solvent total (% by mass) | | 100.00 | 100.00 | 100.00 | 100.00 | 100.00 | 100.00 | 100.00 | 100.00 |
| Solvent C | Si number | 4 | 3 | 3 | 3 | 3 | 3 | 4 | 3 |
| | C number of $R^C$ | 6 | 9 | 9 | 10 | 10 | 10 | 10 | 10 |
| | Total C number of all $R^C$ groups in one molecule | 6 | 9 | 9 | 10 | 20 | 10 | 30 | 10 |
| Clear file waviness | | S | S | S | S | A | S | A | S |
| Wetting characteristics of ink on nozzle plate | | S | S | S | S | S | S | S | S |
| Discharge performance | | S | A | A | A | B | A | C | C |

As shown in the above tables, each of the inks from the Examples exhibited a favorable result for each evaluation. Although a detailed description is not provided here, printing using the inks of each of the Examples was able to produce printed items of satisfactory print density.

In Examples C1 to C4, the solvents C1 to C4 having a single aryl group as a side chain on the trisiloxane structure of the main chain were used.

In Example C5, the solvent C5 having one aryl group at each of the two terminals of the trisiloxane structure of the main chain was used.

In Example C6, the solvent C4 having one aryl group as a side chain on the trisiloxane structure of the main chain was used.

Based on Examples C1 to C6, it was evident that when the C number of all the aryl groups in one molecule was 6 or fewer, the dischargeability was better.

In Comparative Example C1, the solvent C6 having three aryl groups and having a C number for all the aryl groups in one molecule of 30 was used, and the dischargeability deteriorated.

In Comparative Example C2, the amount of the solvent C4 relative to the total mass of solvent in the ink was 10%, and the dischargeability deteriorated.

Production Example D

Inks prepared using alkylene-modified silicone oils are described below as a Production Example D.

[Synthesis of Alkylene-Modified Silicone Oils]

Formulations of alkylene-modified silicone oils are shown in Table D1. Details of the obtained alkylene-modified silicone oils are shown in Table D2.

A four-necked flask was charged with 50 parts by mass of hexane, together with a siloxane compound and a diene compound in the blend proportions shown in Table D1. Subsequently, 0.02 parts by mass of a platinum catalyst (platinum 1,3-divinyl-1,1,3,3-tetramethyldisiloxane complex, manufactured by Sigma-Aldrich Corporation) was added to the flask, and the resulting mixture was stirred at room temperature for 2 to 3 hours. The hexane that acted as the reaction solvent and any unreacted raw materials were then removed by distillation under reduced pressure to obtain the target substance.

In the synthesis of each alkylene-modified silicone oil, mixing was performed so that the molar ratio between the siloxane compound and the diene compound was 2.2:1. In those cases where a plurality of different siloxane compounds were reacted, 1.1 mol of the first siloxane compound was first reacted with 1 mol of the diene compound, and 1.1 mol of the second siloxane compound was then reacted.

The Si number and alkylene group C number for each of the synthesized alkylene-modified silicone oils are shown in Table D2.

The siloxane compounds can be obtained from Tokyo Chemical Industry Co., Ltd. and Gelest, Inc., and the diene compounds can be obtained from Tokyo Chemical Industry Co., Ltd.

[Preparation and Evaluation of Inks]

The formulations and evaluation results of inks are shown in Table D3. The formulation of the solvent used in each ink is shown in the lower part of each table.

The inks were prepared in the same manner as described for the above Examples. Further, each ink was evaluated using the same evaluation methods and evaluation criteria as the above Examples.

TABLE D1

Solvent D formulations

| Solvent D | Siloxane compound (parts by mass) Raw material | Amount | Diene compound (parts by mass) Raw material | Amount |
|---|---|---|---|---|
| Solvent D1 | (1) 1,1,1,3,3-pentamethyldisiloxane | 30.2 | 1,3-butadiene | 5.0 |
| Solvent D2 | (1) 1,1,1,3,3-pentamethyldisiloxane | 19.9 | 1,5-hexadiene | 5.0 |
| Solvent D3 | (1) 1,1,1,3,3-pentamethyldisiloxane | 14.8 | 1,7-octadiene | 5.0 |
| Solvent D4 | (1) 1,1,1,3,3-pentamethyldisiloxane | 9.8 | 1,11-dodecadiene | 5.0 |
| Solvent D5 | (2) 1,1,1,3,5,5,5-heptamethyltrisiloxane | 22.2 | 1,7-octadiene | 5.0 |
| Solvent D6 | (2) 1,1,1,3,5,5,5-heptamethyltrisiloxane | 14.7 | 1,11-dodecadiene | 5.0 |
| Solvent D7 | (3) trimethylsilane | 4.9 | 1,11-dodecadiene | 5.0 |
| Solvent D8 | (1) 1,1,1,3,3-pentamethyldisiloxane<br>(2) 1,1,1,3,5,5,5-heptamethyltrisiloxane | 6.7<br>11.1 | 1,7-octadiene | 5.0 |
| Solvent D9 | (1) 1,1,1,3,3-pentamethyldisiloxane<br>(4) 1,1,1,5,5,5-hexamethyl-3-(trimethylsilyloxy)trisiloxane | 6.7<br>13.4 | 1,7-octadiene | 5.0 |
| Solvent D10 | (4) 1,1,1,5,5,5-hexamethyl-3-(trimethylsilyloxy)trisiloxane | 26.8 | 1,7-octadiene | 5.0 |

TABLE D2

Solvent D details

| Solvent No. | Siloxane compound | Si number/ C number of $R^1$ |
|---|---|---|
| Solvent D1 | $H_3C-Si(CH_3)_2-[O-Si(CH_3)_2]_a-R^1-[Si(CH_3)_2-O]_f-Si(CH_3)_2-CH_3$, $a = f = 1$ | 4/4 |
| Solvent D2 | (same structure) | 4/6 |
| Solvent D3 | (same structure) | 4/8 |
| Solvent D4 | (same structure) | 4/12 |
| Solvent D5 | $H_3C-Si(CH_3)_2-[O-Si(CH_3)(OSi(CH_3)_3)]_b-R^1-[Si(CH_3)(OSi(CH_3)_3)-O]_e-Si(CH_3)_2-CH_3$, $b = e = 1$ | 6/8 |
| Solvent D6 | (same structure) | 6/12 |
| Solvent D7 | $H_3C-Si(CH_3)_2-R^1-Si(CH_3)_2-CH_3$ | 2/12 |
| Solvent D8 | $H_3C-Si(CH_3)_2-[O-Si(CH_3)(OSi(CH_3)_3)]_a-R^1-[Si(CH_3)_2-O]_e-Si(CH_3)_2-CH_3$, $a = e = 1$ | 5/8 |

TABLE D2-continued

| | Solvent D details | |
|---|---|---|
| Solvent No. | Siloxane compound | Si number/ C number of $R^1$ |
| Solvent D9 | [Siloxane structure with $H_3C$-Si-$CH_3$ groups, central chain $H_3C$-Si(-O-Si$_a$-$R^1$-Si-O$_d$-Si-$CH_3$) with branching Si(CH$_3$)$_3$ groups; a = d = 1] | 6 / 8 |
| Solvent D10 | [Siloxane structure with multiple Si(CH$_3$)$_3$ branches on central chain; c = d = 1] | 8 / 8 |

TABLE D3

| Ink formulations and evaluation results | | | | | | |
|---|---|---|---|---|---|---|
| Units: % by mass | | Example D1 | Example D2 | Example D3 | Example D4 | Example D5 |
| Pigment | Carbon black MA77 | 5.00 | 5.00 | 5.00 | 5.00 | 5.00 |
| Dispersant | Solsperse 18000 | 5.00 | 5.00 | 5.00 | 5.00 | 5.00 |
| Solvent | | 90.00 | 90.00 | 90.00 | 90.00 | 90.00 |
| Ink total (% by mass) | | 100.00 | 100.00 | 100.00 | 100.00 | 100.00 |

| Solvent composition | | Example D1 | Example D2 | Example D3 | Example D4 | Example D5 |
|---|---|---|---|---|---|---|
| Silicone oils | Solvent D1 | 40.00 | | | | |
| | Solvent D2 | | 40.00 | | | |
| | Solvent D3 | | | 40.00 | | |
| | Solvent D4 | | | | 40.00 | |
| | Solvent D5 | | | | | 40.00 |
| | Solvent D6 | | | | | |
| | Solvent D7 | | | | | |
| | Solvent D8 | | | | | |
| | Solvent D9 | | | | | |
| | Solvent D10 | | | | | |
| Other solvent | MORESCO White P-60 | 60.00 | 60.00 | 60.00 | 60.00 | 60.00 |
| Solvent total (% by mass) | | 100.00 | 100.00 | 100.00 | 100.00 | 100.00 |
| Solvent D | Si number | 4 | 4 | 4 | 4 | 6 |
| | C number of $R^1$ | 4 | 6 | 8 | 12 | 8 |
| Clear file waviness | | S | S | S | S | S |
| Wetting characteristics of ink on nozzle plate | | B | A | A | A | B |
| Discharge performance | | S | S | S | A | A |

TABLE D3-continued

| | Ink formulations and evaluation results | | | | | |
|---|---|---|---|---|---|---|
| Units: % by mass | | Example D6 | Example D7 | Example D8 | Example D9 | Comparative Example D1 |
| Pigment | Carbon black MA77 | 5.00 | 5.00 | 5.00 | 5.00 | 5.00 |
| Dispersant | Solsperse 18000 | 5.00 | 5.00 | 5.00 | 5.00 | 5.00 |
| Solvent | | 90.00 | 90.00 | 90.00 | 90.00 | 90.00 |
| Ink total (% by mass) | | 100.00 | 100.00 | 100.00 | 100.00 | 100.00 |

| Solvent composition | | Example D6 | Example D7 | Example D8 | Example D9 | Comparative Example D1 |
|---|---|---|---|---|---|---|
| Silicone oils | Solvent D1 | | | | | |
| | Solvent D2 | | | | | |
| | Solvent D3 | | | | | |
| | Solvent D4 | | | | | |
| | Solvent D5 | | | | | |
| | Solvent D6 | 40.00 | | | | |
| | Solvent D7 | | 40.00 | | | |
| | Solvent D8 | | | 40.00 | | |
| | Solvent D9 | | | | 40.00 | |
| | Solvent D10 | | | | | 40.00 |
| Other solvent | MORESCO White P-60 | 60.00 | 60.00 | 60.00 | 60.00 | 60.00 |
| Solvent total (% by mass) | | 100.00 | 100.00 | 100.00 | 100.00 | 100.00 |
| Solvent D | Si number | 6 | 2 | 5 | 6 | 8 |
| | C number of $R^1$ | 12 | 12 | 8 | 8 | 8 |
| Clear file waviness | | S | A | S | S | S |
| Wetting characteristics of ink on nozzle plate | | A | S | B | B | C |
| Discharge performance | | B | S | A | A | B |

As shown in the above tables, each of the inks from the Examples exhibited a favorable result for each evaluation. Although a detailed description is not provided here, printing using the inks of each of the Examples was able to produce printed items of satisfactory print density.

In Examples D1 to D4, the solvents D1 to D4 having an alkylene group sandwiched between and bonded to two pentamethyldisiloxanes were used.

Based on Examples D1 to D4, it was evident that when the carbon number of the alkylene group was 6 or greater, the ink repellency was superior, whereas when the carbon number of the alkylene group was 8 or fewer, the dischargeability was better.

In Examples D5 and D6, the solvents D5 and D6 having an alkylene group sandwiched between and bonded to two trimethylsilyloxytetramethylsiloxanes were used.

In solvent D5 in which the carbon number of the alkylene group was smaller, the dischargeability was superior, whereas in the solvent D6 in which the carbon number of the alkylene group was larger, the ink repellency was superior.

In Example D7, the solvent D7 having an alkylene group sandwiched between and bonded to two trimethylsiloxanes was used.

This example confirmed that clear file deformation could be better prevented when the Si number was 4 or greater.

In Example D8, the solvent D8 having an alkylene group sandwiched between a linear siloxane and a siloxane having a single branched chain was used.

In Example D9, the solvent D9 having an alkylene group sandwiched between a linear siloxane and a siloxane having two branched chains was used.

These examples revealed that as the number of branched chains in the siloxane region increased and the Si number increased, the ink repellency tended to deteriorate.

In Comparative Example D1, the solvent D10 having an alkylene group sandwiched between two siloxanes each having two branched chains was used.

In examples such as Comparative Example D1, in which the branched chains in the siloxane region increased and the Si number reached 8, the ink repellency deteriorated.

<Description of Components>

The components used in the Production Examples A to D are as follows. Further, unless specifically stated otherwise, the same materials were used for those components common to more than one example.

(Pigments)

Carbon black MA77: manufactured by Mitsubishi Chemical Corporation.

Copper phthalocyanine blue: FASTOGEN Blue LA5380, manufactured by DIC Corporation.

Carbon black NEROX500: manufactured by Evonik Japan Co., Ltd. (Pigment Dispersants)

Solsperse 13940: manufactured by The Lubrizol Corporation.

Solsperse 17000: manufactured by The Lubrizol Corporation.

Solsperse 18000: manufactured by The Lubrizol Corporation.

(Other Solvents)

Petroleum-based hydrocarbon solvent: MORESCO White P-60, a paraffin-based solvent, manufactured by MORESCO Corporation.

Petroleum-based hydrocarbon solvent: MORESCO White P-70, a paraffin-based solvent, manufactured by MORESCO Corporation.

Fatty acid ester-based solvent: isotridecyl isononanoate, KAK139, manufactured by Kokyu Alcohol Kogyo Co., Ltd.

Octadecanol: manufactured by Tokyo Chemical Industry Co., Ltd.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising a colorant and a non-aqueous solvent, wherein the non-aqueous solvent contains at least 15% by mass but not more than 100% by mass, relative to a total mass of the non-aqueous solvent, of an organosilicon compound having 2 to 6 silicon atoms in one molecule, having an organic group in which a carbon atom is bonded directly to a silicon atom and in which a total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule.

2. The oil-based inkjet ink according to claim 1, wherein the organic group in which a total number of carbon atoms and oxygen atoms is at least 4 that is contained in the organosilicon compound is at least one group selected from the group consisting of alkyl groups having at least 4 carbon atoms, carboxylate ester linkage-containing groups in which a total number of carbon atoms and oxygen atoms is at least 4, aromatic ring-containing groups having at least 6 carbon atoms, and alkylene groups having at least 4 carbon atoms.

3. The oil-based inkjet ink according to claim 1, wherein the organosilicon compound is a compound represented by general formula (X) shown below:

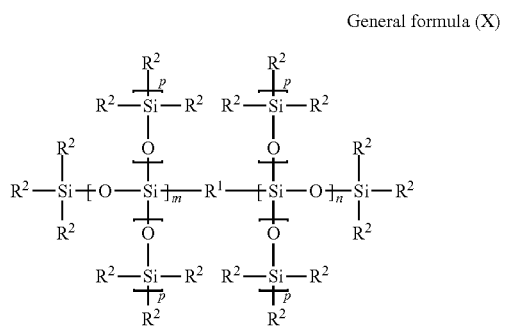

General formula (X)

wherein $R^1$ represents an oxygen atom or a divalent organic group having a carbon atom bonded directly to each silicon atom, each $R^2$ independently represents a monovalent organic group having a carbon atom bonded directly to a silicon atom, each of m and n independently represents an integer of 0 to 4, each p independently represents an integer of 0 to 2, a number of silicon atoms within one molecule is from 2 to 6, at least one of $R^1$ and $R^2$ is an organic group in which a total number of carbon atoms and oxygen atoms is at least 4, and a total number of carbon atoms and oxygen atoms, contained within all of the organic groups in which a total number of carbon atoms and oxygen atoms is at least 4, is from 4 to 20 within one molecule.

4. The oil-based inkjet ink according to claim 3, wherein in general formula (X), $R^1$ represents an oxygen atom or an alkylene group having at least 4 carbon atoms, each $R^2$ independently represents a methyl group, an alkyl group having at least 4 carbon atoms, a carboxylate ester linkage-containing group in which a total number of carbon atoms and oxygen atoms is at least 4, or an aromatic ring-containing group having at least 6 carbon atoms, at least one of $R^1$ and $R^2$ is an organic group selected from the group consisting of alkylene groups having at least 4 carbon atoms, alkyl groups having at least 4 carbon atoms, carboxylate ester linkage-containing groups in which a total number of carbon atoms and oxygen atoms is at least 4, and aromatic ring-containing groups having at least 6 carbon atoms, and a total number of carbon atoms and oxygen atoms, contained within all of the alkylene groups having at least 4 carbon atoms, alkyl groups having at least 4 carbon atoms, carboxylate ester linkage-containing groups in which a total number of carbon atoms and oxygen atoms is at least 4, and aromatic ring-containing groups having at least 6 carbon atoms, is from 4 to 20 within one molecule.

5. The oil-based inkjet ink according to claim 1, wherein in the organosilicon compound, a total number of carbon atoms and oxygen atoms contained within all of the organic groups in which a total number of carbon atoms and oxygen atoms is at least 4 is from 4 to 12 within one molecule.

6. The oil-based inkjet ink according to claim 1, wherein in the organosilicon compound, a total number of carbon atoms and oxygen atoms contained within all of the organic groups in which a total number of carbon atoms and oxygen atoms is at least 4 is from 8 to 20 within one molecule.

7. The oil-based inkjet ink according to claim 1, wherein an amount of the organosilicon compound is from 15 to 80% by mass relative to a total mass of the non-aqueous solvent.

8. The oil-based inkjet ink according to claim 1, wherein an amount of the organosilicon compound is from 25 to 55% by mass relative to a total mass of the non-aqueous solvent.

9. The oil-based inkjet ink according to claim 1, wherein the organosilicon compound is a silicone oil, and the silicone oil is a compound represented by general formula (X-1) shown below:

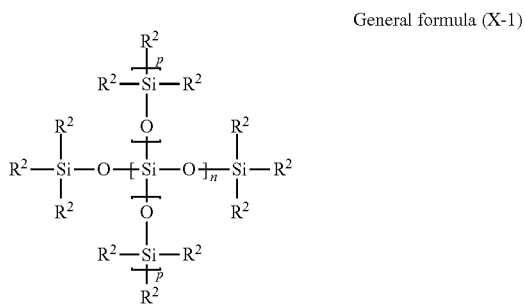

General formula (X-1)

wherein each $R^2$ independently represents a monovalent organic group having a carbon atom bonded directly to a silicon atom, n represents an integer of 0 to 4, each p independently represents 0 or 1, a number of silicon atoms within one molecule is from 2 to 6, at least one $R^2$ is an organic group in which a total number of carbon atoms and oxygen atoms is at least 4, and a total number of carbon atoms and oxygen atoms, contained within all of the organic groups in which a total number of carbon atoms and oxygen atoms is at least 4, is from 4 to 20 within one molecule.

10. The oil-based inkjet ink according to claim 1, wherein the organosilicon compound is a silicone oil, and the silicone oil is a compound represented by general formula (A1) shown below:

General formula (A1)

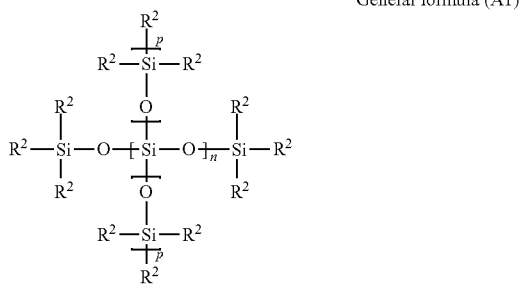

wherein each $R^2$ independently represents a methyl group or an alkyl group having at least 4 carbon atoms, n represents an integer of 0 to 4, each p independently represents 0 or 1, a number of silicon atoms within one molecule is from 2 to 6, at least one $R^2$ is an alkyl group having at least 4 carbon atoms, and a total number of carbon atoms contained within all of the alkyl groups having at least 4 carbon atoms is from 4 to 20 within one molecule.

11. The oil-based inkjet ink according to claim 1, wherein the organosilicon compound is a silicone oil, and the silicone oil is a compound represented by general formula (1) shown below:

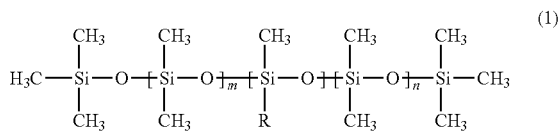

(1)

wherein R represents an alkyl group having a straight chain or branched chain of 4 to 20 carbon atoms, and each of m and n independently represents an integer of 0 to 2, provided that m+n≤2.

12. The oil-based inkjet ink according to claim 11, wherein in general formula (1), R represents an alkyl group having a straight chain or branched chain of 4 to 12 carbon atoms.

13. The oil-based inkjet ink according to claim 11, wherein in general formula (1), R represents an alkyl group having a straight chain or branched chain of 8 to 20 carbon atoms.

14. The oil-based inkjet ink according to claim 11, wherein in general formula (1), m and n are both 0.

15. The oil-based inkjet ink according to claim 1, wherein the organic group in which a total number of carbon atoms and oxygen atoms is at least 4 that is contained in the organosilicon compound is an alkyl group having at least 10 carbon atoms.

16. The oil-based inkjet ink according to claim 15, wherein a number of silicon atoms in one molecule of the organosilicon compound is 3.

17. The oil-based inkjet ink according to claim 9, wherein in general formula (X-1), each $R^2$ independently represents a methyl group, or a carboxylate ester linkage-containing group in which a carbon atom is bonded directly to a silicon atom and in which a total number of carbon atoms and oxygen atoms is at least 4, n represents an integer of 0 to 4, each p independently represents 0 or 1, a number of silicon atoms within one molecule is from 2 to 6, at least one $R^2$ is the carboxylate ester linkage-containing group, and a total number of carbon atoms and oxygen atoms contained within all of the carboxylate ester linkage-containing groups within one molecule is from 4 to 20.

18. The oil-based inkjet ink according to claim 9, wherein in general formula (X-1), each $R^2$ independently represents a methyl group, or an aromatic ring-containing group having at least 6 carbon atoms in which a carbon atom is bonded directly to a silicon atom, n represents an integer of 0 to 4, each p independently represents 0 or 1, a number of silicon atoms within one molecule is from 2 to 6, at least one $R^2$ is the aromatic ring-containing group, and a total number of carbon atoms and oxygen atoms contained within all of the aromatic ring-containing groups within one molecule is from 4 to 20.

19. The oil-based inkjet ink according to claim 1, wherein the organosilicon compound is a compound in which a silyl group or at least one siloxane linkage is bonded to each terminal of an alkylene group having at least 4 carbon atoms.

20. The oil-based inkjet ink according to claim 3, wherein in general formula (X), $R^1$ represents an alkylene group having at least 4 carbon atoms, each $R^2$ represents a methyl group, each of m and n independently represents an integer of 0 to 4, each p independently represents an integer of 0 to 2, and a number of silicon atoms within one molecule is from 2 to 6.

21. The oil-based inkjet ink according to claim 1, wherein the colorant comprises a pigment, the ink further comprises a pigment dispersant, and the pigment dispersant is absorbed directly to the surface of the pigment.

22. The oil-based inkjet ink according to claim 1, wherein the organosilicon compound is not more than 80% by mass, relative to a total mass of the non-aqueous solvent.

23. The oil-based inkjet ink according to claim 1, wherein the ink has a viscosity of 5 to 30 mPa·s at 23° C.

* * * * *